(12) United States Patent
Leimbach et al.

(10) Patent No.: US 6,427,548 B1
(45) Date of Patent: Aug. 6, 2002

(54) AUTOMATIC TRANSMISSION

(75) Inventors: Lutz Leimbach, Schweinfurt; Reiner Voss, Maibach; Thomas Wirth, Schwanfeld; Andreas Ratte, Dittelbrunn-Hambach, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/506,194

(22) Filed: Feb. 17, 2000

(30) Foreign Application Priority Data

Feb. 17, 1999 (DE) .......................................... 199 06 607
Mar. 22, 1999 (DE) .......................................... 199 12 817

(51) Int. Cl.$^7$ ................................................ F16H 3/08
(52) U.S. Cl. .......................................... 74/331; 74/333
(58) Field of Search ........................... 74/335, 333, 331

(56) References Cited

U.S. PATENT DOCUMENTS

| | | | | |
|---|---|---|---|---|
| 4,461,188 A | * | 7/1984 | Fisher .......................... | 74/330 |
| 4,777,837 A | * | 10/1988 | Lehle ........................... | 74/360 |
| 5,181,431 A | * | 1/1993 | Zaiser et al. .................. | 74/333 |
| 5,720,203 A | * | 2/1998 | Honda et al. .................. | 74/325 |
| 6,021,880 A | * | 2/2000 | Reed, Jr. et al. .............. | 74/335 |
| 6,055,879 A | * | 5/2000 | Abe et al. ..................... | 74/335 |

* cited by examiner

*Primary Examiner*—Dirk Wright
(74) *Attorney, Agent, or Firm*—Cohen, Pontani, Lieberman & Pavane

(57) ABSTRACT

An automatic transmission, especially for a motor vehicle, having a plurality of torque transmission paths which can be selectively activated for torque transmission. The torque transmission paths have different transmission characteristics and, based on their transmission characteristics, can be ordered in a sequence of torque transmission paths has a clutch arrangement by which at least one of the torque transmission paths can be activated. It is provided that the clutch arrangement has a clutch unit which is associated with a group of torque transmission paths and by which a torque transmission path of a group of torque transmission paths can be selectively activated. A plurality of groups of torque transmission paths are provided, each group having only one individual torque transmission path, or a plurality of groups of torque transmission paths are provided, at least one group having a plurality of torque transmission paths, or a plurality of groups of torque transmission paths are provided, at least one group having an individual torque transmission path and at least one additional group having a plurality of torque transmission paths. At least one group of torque transmission paths, insofar as it includes a plurality of torque transmission paths, has only torque transmission paths which do not immediately follow one another in sequence.

14 Claims, 13 Drawing Sheets

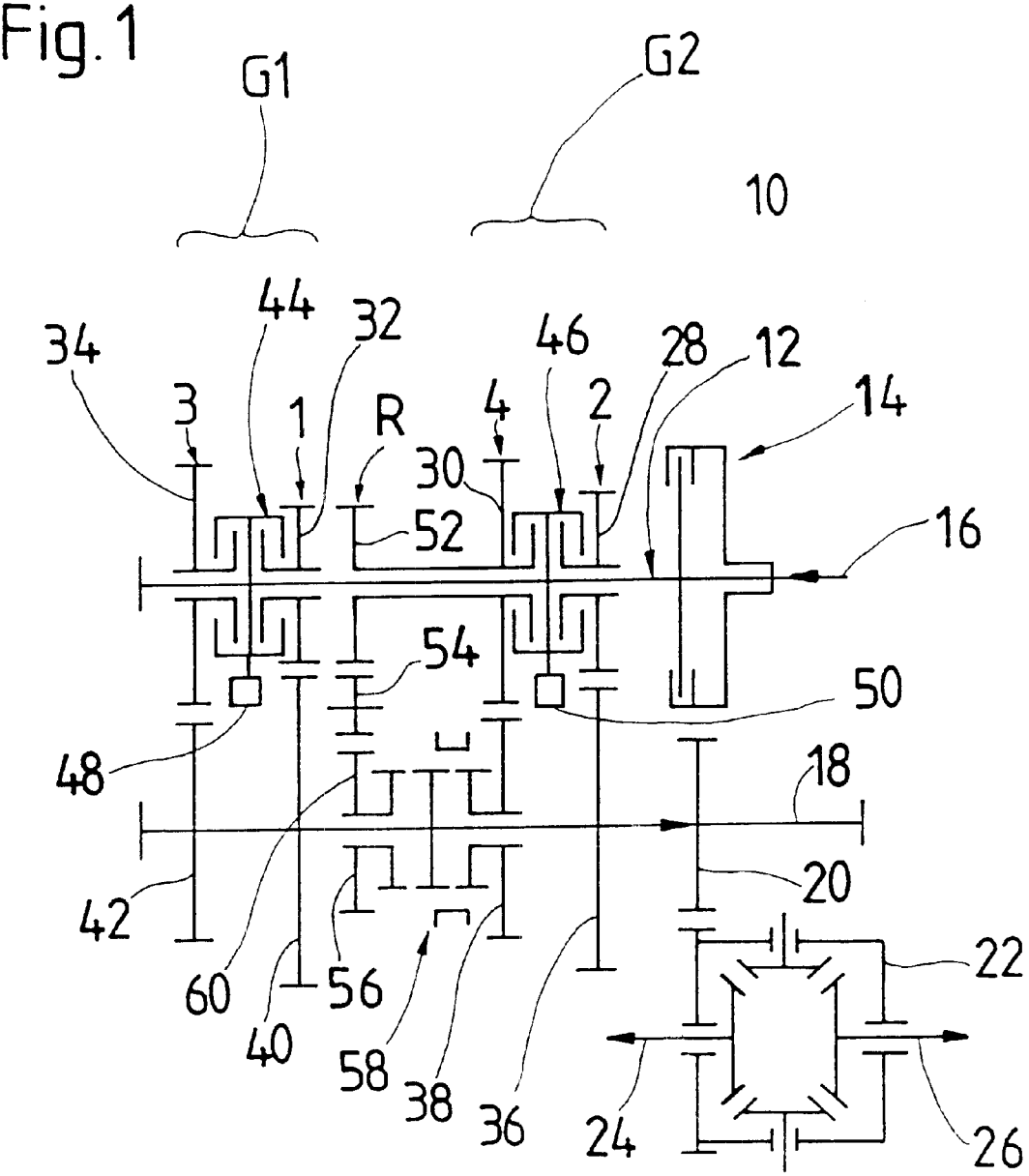

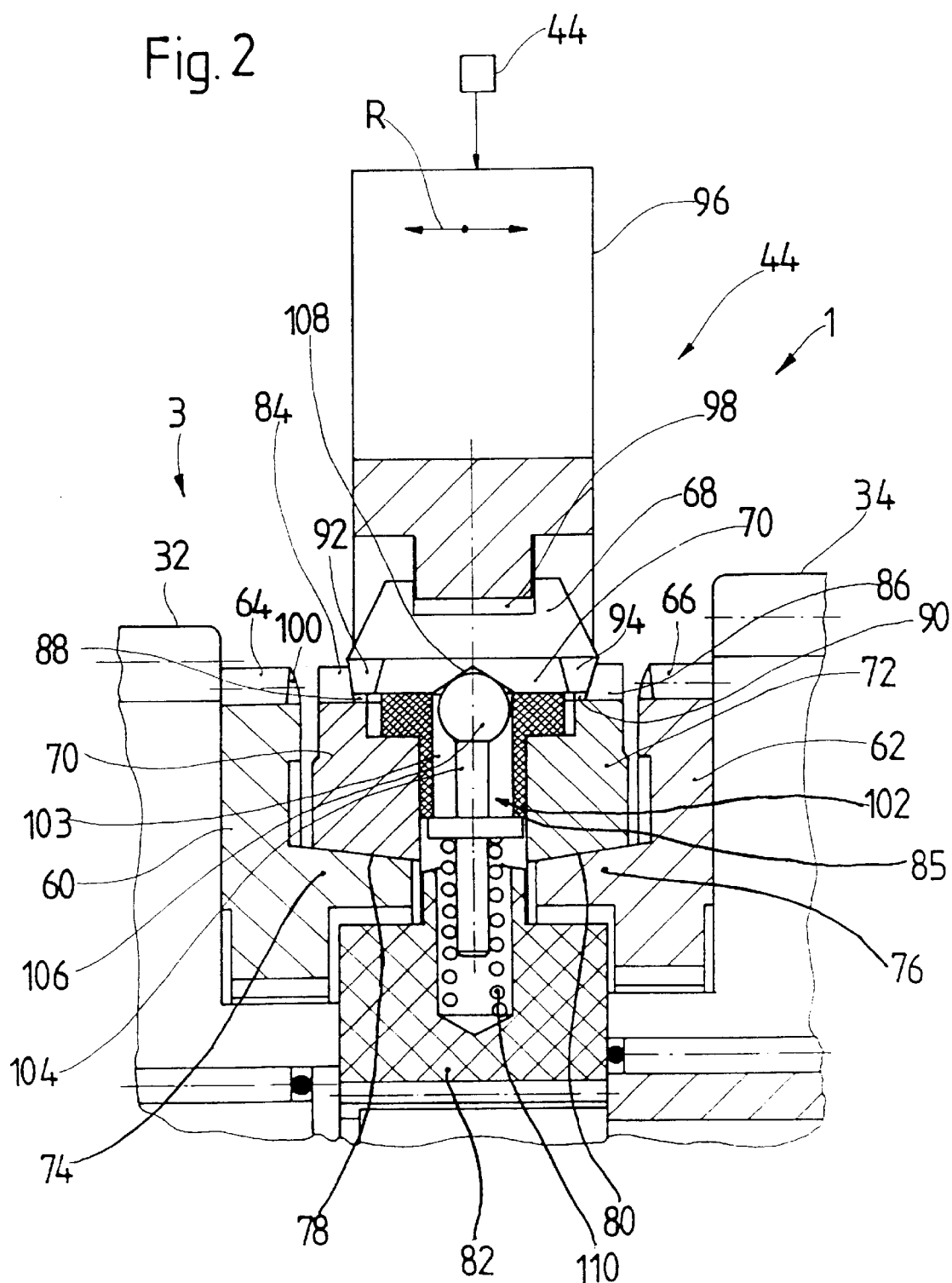

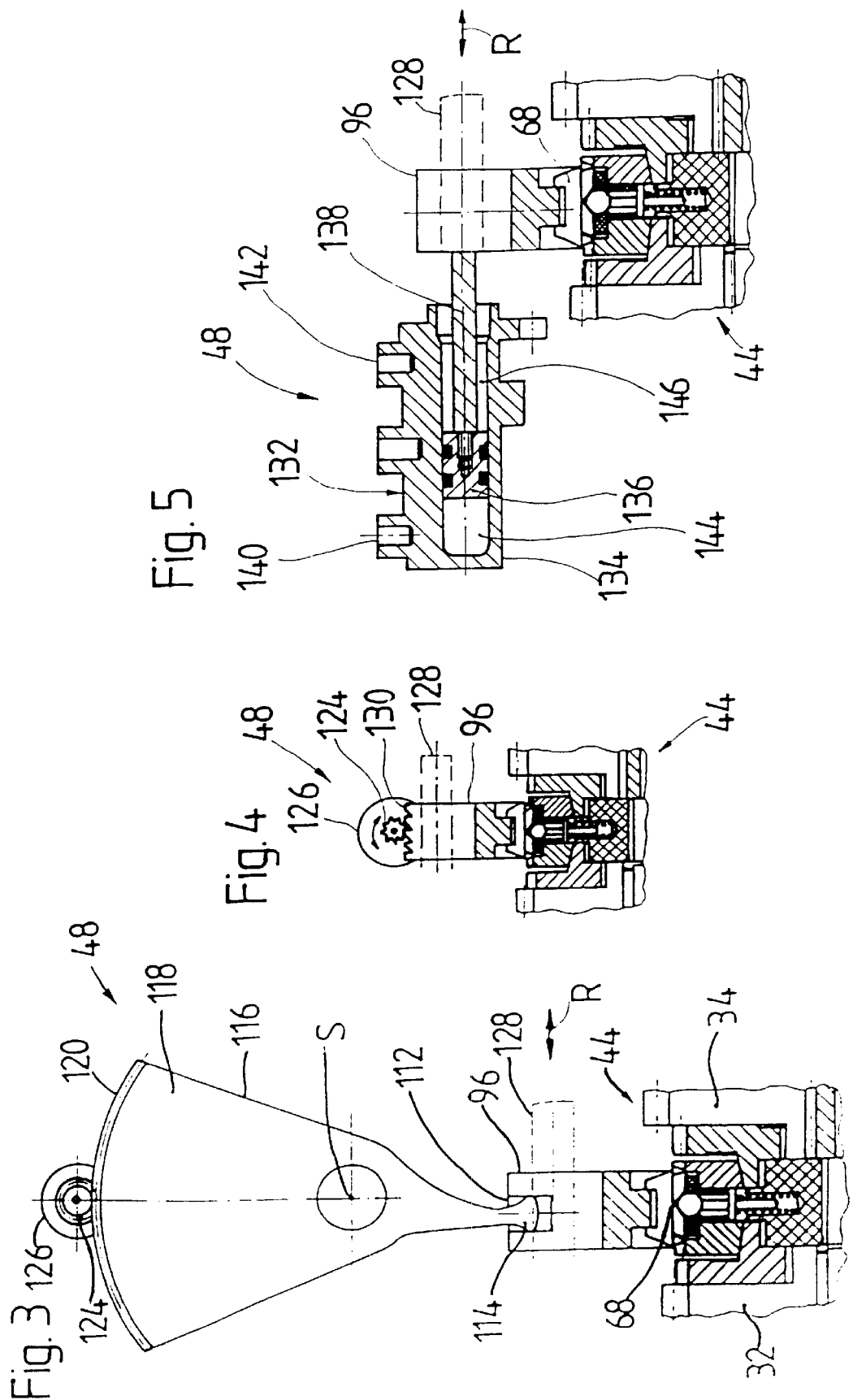

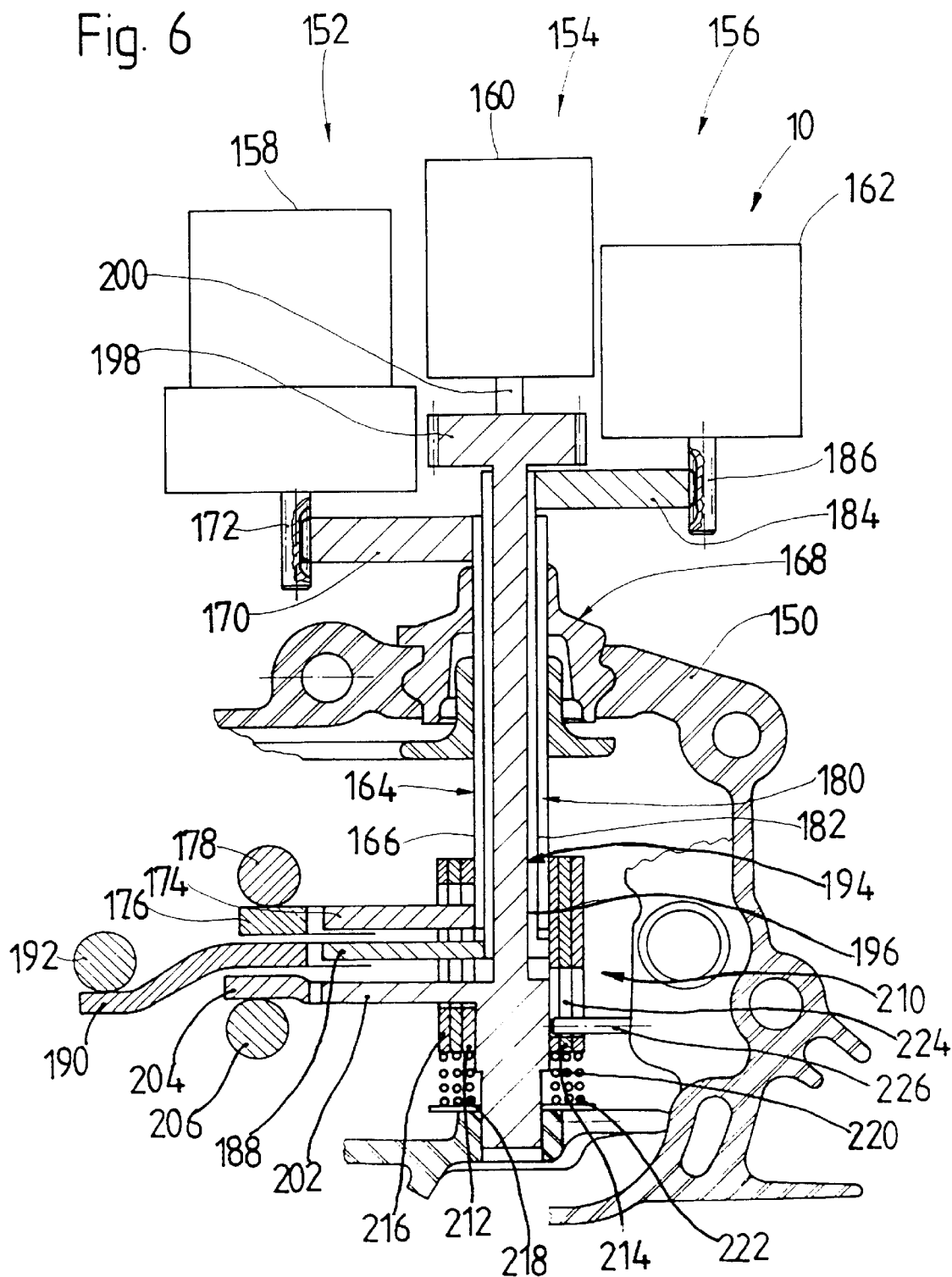

AUTOMATIC TRANSMISSION

BACKGROUND OF THE INVENTION

1. Field of the Invention

The present invention is directed to an automatic transmission, especially for a motor vehicle.

2. Discussion of the Prior Art

Modem developments in automotive engineering have increasingly moved away from manual shift transmissions, i.e., transmissions in which a shifting force is transmitted mechanically from a gear lever to the transmission, toward automatic transmissions. In these transmissions, the shifting selected by the driver is determined in that a movement of the shift lever is detected by an associated sensor arrangement or automated program and, based on the detected shifting selection, an actuator arrangement is put into operation in the transmission for carrying out the desired shifting procedure. For this purpose, transmissions constructed for manual operation are outfitted in such a way that, e.g., a shifting shaft which is to be moved linearly and possibly rotationally for carrying out a shifting process is moved by means of these actuators which initiate required movements. Accordingly, when carrying out shifting processes, appropriate actuation of the shifting shaft deactivates a coupling device, e.g., in the form of a synchronizing mechanism, adjusting a previously engaged gear and, only after this device has been deactivated by the movement of the shifting shaft, the coupling device associated with the next gear speed to be adjusted is activated in the course of further movement of the shifting shaft. The time required for carrying out a shifting procedure in this way is relatively lengthy because a previously adjusted gear speed must first be fully disengaged and the shifting shaft must then be moved further to the next required position before a new gear speed can be engaged. Another problem consists in that the design of the actuators driving the shifting shaft must be appropriate to the actuating path to be traversed as well as to the required shifting force, so that relatively large drive units are required in order that the necessary shifting force can still be provided in the case of relatively long shifting paths.

SUMMARY OF THE INVENTION

Accordingly, it is an object of the present invention to provide an automatic transmission which minimizes the time required for carrying out shifting procedures in a simplified construction.

According to the invention, this object is met by an automatic transmission, especially for a motor vehicle, comprising a plurality of torque transmission paths which can be selectively activated for torque transmission, wherein the torque transmission paths have different transmission characteristics and, based on their transmission characteristics, can be ordered in a sequence of torque transmission paths. The transmission further comprises a clutch arrangement by which at least one of the torque transmission paths can be activated.

It is further provided in the transmission according to the invention that the clutch arrangement has a clutch unit which is associated with a group of torque transmission paths and by which a torque transmission path of a group of torque transmission paths may be selectively activated. A plurality of groups of torque transmission paths are provided, each group comprising only one individual torque transmission path, or a plurality of groups of torque transmission paths are provided, at least one group comprising a plurality of torque transmission paths, or a plurality of groups of torque transmission paths are provided, at least one group comprising an individual torque transmission path and at least one additional group comprising a plurality of torque transmission paths. At least one group of torque transmission paths, insofar as it comprises a plurality of torque transmission paths, comprises only torque transmission paths which do not immediately follow one another in sequence.

As a result of the construction, according to the invention, of an automatic transmission, it is ensured due to the appropriate grouping of different torque transmission paths and the allocation of the same to a respective coupling unit that independence from the predetermined sequence is maintained to a great extent. It is assumed, for instance, that the sequence in which the individual torque transmission paths can be ordered or listed with respect to their transmission characteristics is an indication of the descending speed reduction ratio. Accordingly, this results in a sequence which, in conventional transmissions, is defined by the individual gear speeds: first gear, second gear, third gear, fourth gear, and so on. Since it is now ensured in the transmission according to the invention that two torque transmission paths immediately following one another in this sequence are not serviced by the same clutch unit, it is possible, for example, when carrying out a shifting process from first gear to second gear, to disengage the clutch unit associated with the first gear and to engage the clutch unit associated with the second gear virtually simultaneously or with a slight delay in time, wherein, in this case, the first gear and the second gear are arranged in different groups and therefore are to be activated by means of different clutch units. Accordingly, it is not necessary to wait until the first gear is fully disengaged before activating or engaging the second gear. In this way, an appreciably faster shifting process can be carried out and the inconvenience resulting in the prior art from a period of interruption of tractive force can be appreciably reduced when carrying out the shifting process.

According to the present invention, different alternatives are possible with respect to the grouping of the individual torque transmission paths. Within the meaning of the present invention, the term "group" does not necessarily signify the assemblage of a plurality of torque transmission paths. For example, it is also possible that every group contains only one individual member, that is, an individual torque transmission path, or is defined thereby. Ultimately, this means that every individual torque transmission path is assigned its own clutch unit and that a plurality of torque transmission paths are not to be serviced by one individual clutch unit. Also, the individual torque transmission paths can be controlled optionally in this way for activation or deactivation of the same. It is also possible, for example, that a plurality of torque transmission paths is contained in one group, while the rest of the torque transmission paths are each positioned individually in respective groups, so that these individual torque transmission paths can again be controlled by their own clutch units and the plurality of torque transmission paths assembled in the group are to be activated or deactivated by a common clutch unit. Basically, the principles of the present invention already result in an improved transmission construction when, in the case of a plurality of groups of torque transmission paths, several of which also comprise a plurality of torque transmission paths, only one individual group is provided in which the torque transmission paths to be activated or deactivated by a clutch unit do not directly follow one another in the defined sequence.

A particularly simple construction can be achieved in that an actuator unit is associated with every clutch unit of the clutch arrangement. The independence of the individual clutch units can be further increased in this way.

For example, every clutch unit for every torque transmission path of the group of torque transmission paths associated with this clutch unit can comprise a synchronizing mechanism.

Further, a particularly simple construction can be achieved in the transmission according to the invention when the transmission has an input shaft and every torque transmission path comprises a transmission member, preferably a transmission gearwheel, which can be coupled by the clutch arrangement to the input shaft for common rotation therewith.

An overly complex construction of the individual clutch units can be avoided when every group of torque transmission paths comprises two torque transmission paths.

The different torque transmission paths can be divided into different groups in a particularly expedient manner in that between every two torque transmission paths of at least one group of torque transmission paths, which two torque transmission paths follow one another in sequence with respect to their transmission characteristic, there is located at least one torque transmission path of another group of torque transmission paths. It will be seen from this that, within the meaning of the present invention, torque transmission paths which are contained in a group of torque transmission paths and which follow one another in sequence are those torque transmission paths between which no other torque transmission paths are located in this group with respect to the sequence. However, due to the fact that no torque transmission paths following one another directly in sequence may be contained in one group, the sequence still has, between two torque transmission paths which are contained in one group and which follow one another with respect to the sequence, at least one additional torque transmission path not contained in this group. For example, if the torque transmission paths for the first gear, the third gear and the fifth gear are contained in a group, the torque transmission path for the third gear is a torque transmission path which follows, but does not directly follow, the torque transmission path of the first gear in terms of the sequence. The torque transmission path which directly follows the torque transmission path for the first gear would be the torque transmission path for the second gear.

It may be provided, for example, that a first group of torque transmission paths comprises the torque transmission paths for a first gear speed and a third gear speed and that a second group of torque transmission paths comprises the torque transmission paths for a second gear speed and a fourth gear speed and, possibly, for a reverse gear.

In a particularly preferred constructional type, it is provided that between two torque transmission paths of at least one group of torque transmission paths, which two torque transmission paths follow one another in sequence with respect to their characteristic, there are at least two torque transmission paths which are not contained in this group. This type of construction of the transmission according to the invention takes into account the fact that in certain driving situations the torque transmission paths which follow one another directly in the sequence are not traversed consecutively but, rather, e.g., at least one torque transmission path occurring in the sequence is skipped. For example, it may happen that when a passing process is started proceeding from fourth gear, the driver may shift back into second gear rather than third gear in order to provide sufficient torque and sufficient engine output. Accordingly, by ensuring that between two torque transmission paths following one another based on the sequence in a group there are two torque transmission paths not contained in this group, it is necessarily ensured that when a torque transmission path is skipped a torque transmission path which is adjusted or active at that moment and a subsequent torque transmission path to be adjusted after skipping over a torque transmission path are not deactivated or activated by the same clutch unit. Therefore, the advantage according to the invention of an appreciably reduced shifting time and appreciably increased shifting convenience is also maintained when skipping over a torque transmission path.

This can be realized, for example, in that a first group of torque transmission paths comprises the torque transmission paths for the first and fourth gear speeds, in that a second group of torque transmission paths comprises the torque transmission paths for the second and fifth gear speeds, and in that a third group of torque transmission paths comprises the torque transmission path for the third gear speed and, optionally, the torque transmission path for a reverse gear and/or a sixth gear speed.

A particularly simple construction of the actuator units can be achieved when at least one of the actuator units has an electric-motor drive unit, preferably a brushless electric motor, which preferably acts on the associated clutch unit via a transmission arrangement.

Particularly when used in commercial vehicles, but also in passenger motor vehicles which generally have a hydraulic or pneumatic circuit, the required shifting force can advantageously be provided in that at least one of the actuator units has a hydraulic or pneumatic cylinder arrangement which acts on the associated clutch unit directly or via a force-converting arrangement, preferably a lever arrangement.

Alternatively, it is also possible that at least one of the actuator units has a lifting magnet arrangement which acts on the associated clutch unit directly or via a force-converting arrangement, preferably a lever arrangement, or in that at least one of the actuator units comprises a piezo actuator arrangement which acts on the associated clutch unit directly or via a force-converting arrangement, preferably a lever arrangement.

As was already mentioned above, the transmission characteristics of the individual torque transmission paths can be defined by a speed reduction ratio provided in the respective torque transmission paths and the sequence of torque transmission paths can be defined by a series of torque transmission paths with ascending and descending speed reduction ratios.

It is noted that within the meaning of the present Application, the "activation" of a torque transmission path means that a determined torque transmission path is changed from a state in which it was not used for transmitting torque between a transmission input shaft and a transmission output shaft into a state in which the force-coupling between the input shaft and the output shaft is achieved by means of precisely this torque transmission path. Accordingly, in this sense, the term "activation" designates the engagement or adjustment of a determined torque transmission path, generally of a determined gear speed.

As was already mentioned in the beginning, different gears are generally selected in conventional shift transmissions in such a way that an actuating element is displaced for selecting a determined shift path and, when the determined shift path is selected, a shifting claw or shifting fork can be moved in one of two directions by rotating the actuating element, so that one of two torque transmission paths to be activated by this shifting claw is activated. When changing gears, the shifting claw must first be moved back again into the neutral position and, if necessary, the actuating element is displaced linearly again and a different shifting claw is moved out of its neutral position into a position activating a torque transmission path. The movement of the actuating element is carried out via a plurality of actuators as is known from EP 0 422 278 A1. In order to overcome the disadvantage of known transmissions of this type, namely, the disadvantage that the time required for carrying out determined shift processes can be relatively long, the present invention further suggests an automatic transmission, especially for a motor vehicle, comprising a plurality of clutch units, wherein at least one torque transmission path of the transmission can be activated by each of the clutch units. According to the invention, an actuator unit is associated with at least one clutch unit, preferably with every clutch unit.

This means that this at least one clutch unit can be controlled solely by the actuator unit assigned to it, i.e., independent from other clutch units. As a result, the sequential movement states required in the prior art for carrying out a shifting process can be avoided, since the at least one clutch unit can be activated and deactivated while another clutch unit can be acted on simultaneously or with time staggering.

For this purpose, every actuator unit comprises a drive unit and a driving force transmission unit by means of which the driving force of the drive unit can be transmitted to the respective associated clutch unit.

In order to be able to operate in a construction of the type mentioned above with transmissions of conventional construction, i.e., so that essentially only the conventional mainshaft needs to be replaced by other components, it is suggested that every driving-force transmission unit comprises a transmission shaft which can be set in rotation by the associated drive unit. It is preferably provided that at least two of the transmission shafts of different actuator units are arranged coaxial to one another. It is most preferable that all transmission shafts of the different actuator units are arranged coaxial to one another.

The clutch units can also be accessed directly or a plurality of shifting shafts can be used.

In order to provide sufficient space for positioning actuator units in a simple manner, it is suggested that the shafts which are arranged coaxial to one another penetrate a housing of the transmission and are rotatably supported at the latter. In this case, it is preferably provided that each of the transmission shafts is constructed in a first end area for driving-coupling with the associated drive unit and has, in a second end area, a transmission member by means of which the driving force is conducted to an actuating member of the associated clutch device.

According to an alternative construction, every driving-force transmission unit can comprise a swivelable transmission lever element which is drive-coupled in a first end area with the drive unit associated with the latter and is constructed in a second end area for transmitting driving force to an actuating member of the associated clutch unit.

It is noted that the above-described construction of the driving-force transmission units can be combined with this type of construction in such a way that the driving-force transmission unit which is constructed in the manner of a lever is used for at least one clutch unit and the driving-force transmission unit which is constructed in the manner of a shaft is used for at least one clutch unit.

However, it is preferably provided for this purpose that a plurality, preferably all, of the swivelable transmission lever elements are swivelable about the same swiveling axis.

When a shifting process is carried out, the force required for engaging or disengaging a determined gear speed, i.e., for activating or deactivating a determined torque transmission path, is not constant over the actuating path. Accordingly, only a relatively slight force need be applied at first when disengaging a gear speed until the neutral position of a clutch unit is reached and, when changing to the new gear speed to be engaged, a relatively large force is required in the area of the synchronizing mechanism. Therefore, in conventional transmissions, the actuator units which are used must be dimensioned in such a way that they are capable of delivering or applying the maximum required force, i.e., the maximum required torque. However, this means that the actuating path which can be covered per unit of time is relatively small, which in turn results in that the time required for carrying out a shifting process is relatively long. Therefore, according to another feature of the present invention, it is suggested that a transmission arrangement with variable force transmission and path transmission capability is provided in the force transmission path between a drive unit of an actuator unit associated with a clutch unit and the clutch unit.

By means of transmission arrangements of this kind, it is possible to adapt in such a way that when larger forces must be delivered these forces are also generated, whereas when smaller forces are sufficient, only smaller forces, and hence a greater travel, is generated.

For example, the transmission arrangement can be constructed such that a smaller actuating force or a larger actuating path is provided for the clutch unit in the area of a driving position corresponding to a neutral position of the associated clutch unit than is provided in the area of a driving position of the actuator arrangement which corresponds to a position activating a torque transmission path and/or to a synchronizing position of the clutch unit.

In a particularly simple construction of this embodiment form, the transmission arrangement comprises a noncircular gearwheel arrangement.

In an automatic transmission in which different clutch units are to be controlled by different actuator units, there is basically no mechanical interaction between the clutch units or actuator units themselves. In case of faulty controlling, for example, which may possibly be caused by an error in a control program, this means that when a torque transmission path is already activated by a clutch unit, a different torque transmission path should be activated by a different clutch unit. However, this can lead to a defect in the transmission. In order to avoid such states, it is suggested that a safety arrangement is provided, wherein, when a torque transmission path is activated by a clutch unit, this safety arrangement prevents activation of another torque transmission path by another clutch unit.

For example, it can be provided that the safety arrangement comprises a safety member for at least one clutch unit which, when a torque transmission path is activated by one clutch unit, prevents the actuation of at least one other clutch unit.

The safety member associated with a clutch unit can have at least one activation portion which can be acted upon when the clutch unit is actuated by an actuating portion associated with that clutch unit and has, for at least one other clutch unit, at least one blocking portion which blocks an actuation portion associated with the at least one other clutch unit when the at least one activation portion is acted upon.

However, each clutch unit is preferably provided with a safety member which has at least one activation portion for this clutch unit and at least one blocking portion for all other clutch units.

Particularly in the above-described embodiment form of the actuator units with transmission shafts arranged coaxial to one another, it is preferably provided that the transmission shafts of different actuator units, which transmission shafts are arranged coaxial to one another, are enclosed by safety sleeves which are arranged coaxial to one another, wherein a safety sleeve is associated with every transmission shaft and forms a safety member for the clutch unit connected with the transmission shaft, and wherein every safety sleeve has at least one activation portion cooperating with the associated transmission shaft or with a component connected therewith, and has at least one blocking portion for at least one, preferably all, other transmission shafts or components connected therewith.

For this purpose, every safety sleeve can be displaced in the longitudinal direction of the transmission shafts and pretensioned in a position in which no blocking portion is active and when an activation portion is acted upon each of these safety sleeves can be moved into a position in which every blocking portion thereof blocks any movement of the associated transmission shaft or the component connected therewith.

The present invention is described in detail in the following with reference to the accompanying drawings showing preferred embodiment forms.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 1 shows a schematic view of a transmission according to the invention with the various torque transmission paths;

FIG. 2 shows a detail in longitudinal section of a clutch unit provided in the transmission according to the invention;

FIG. 3 shows a first embodiment of an actuator unit according to the invention;

FIG. 4 shows a second embodiment of an actuator unit according to the invention;

FIG. 5 shows a third embodiment of an actuator unit according to the invention;

FIG. 6 shows a partial sectional view of an automatic transmission, according to the invention, with three actuator units assigned to different clutch units;

DETAILED DESCRIPTION OF THE PREFERRED EMBODIMENTS

Figure 7:
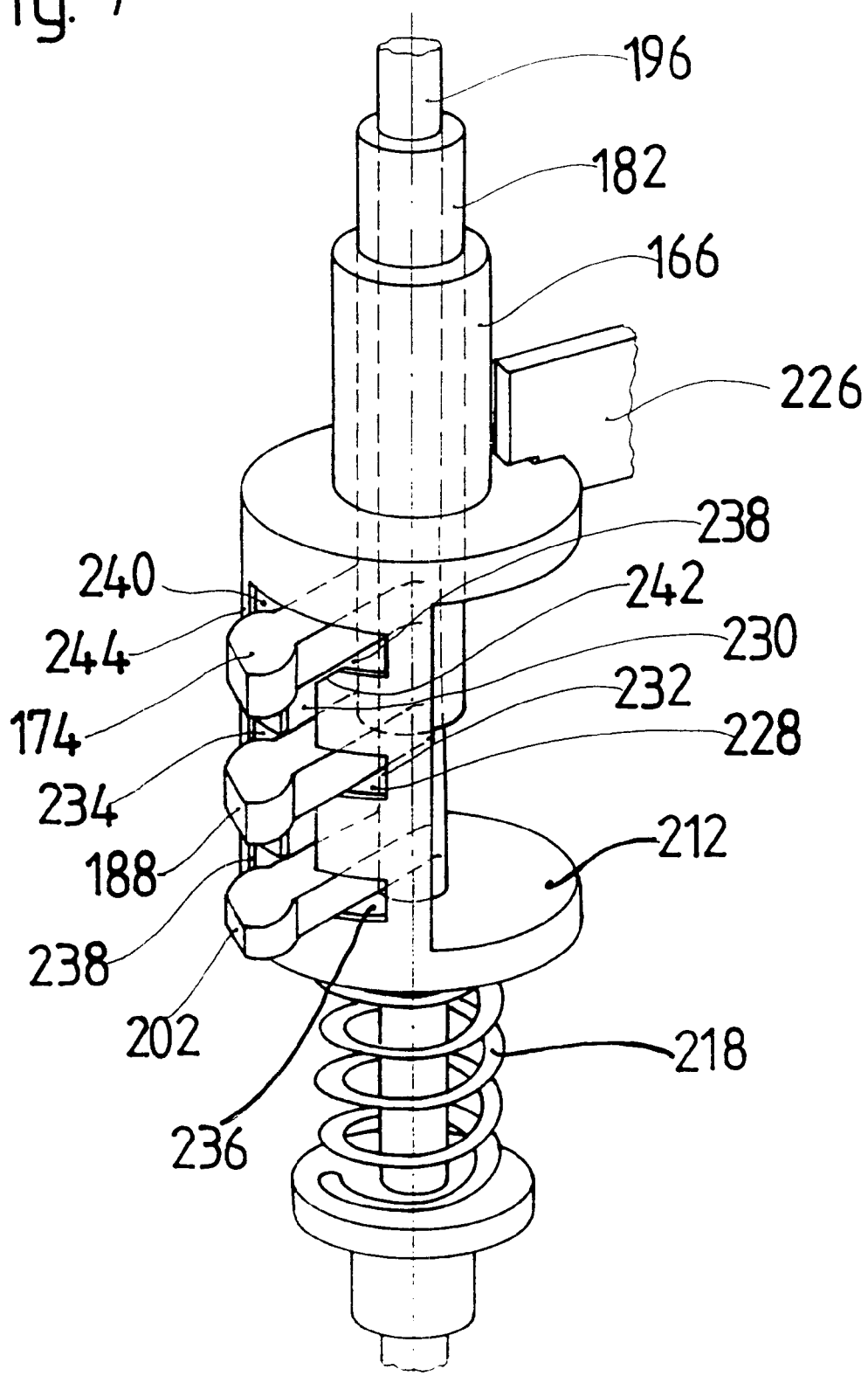
FIG. 7 shows a perspective partial view of the actuator units with a safety sleeve.
Figure 8A:
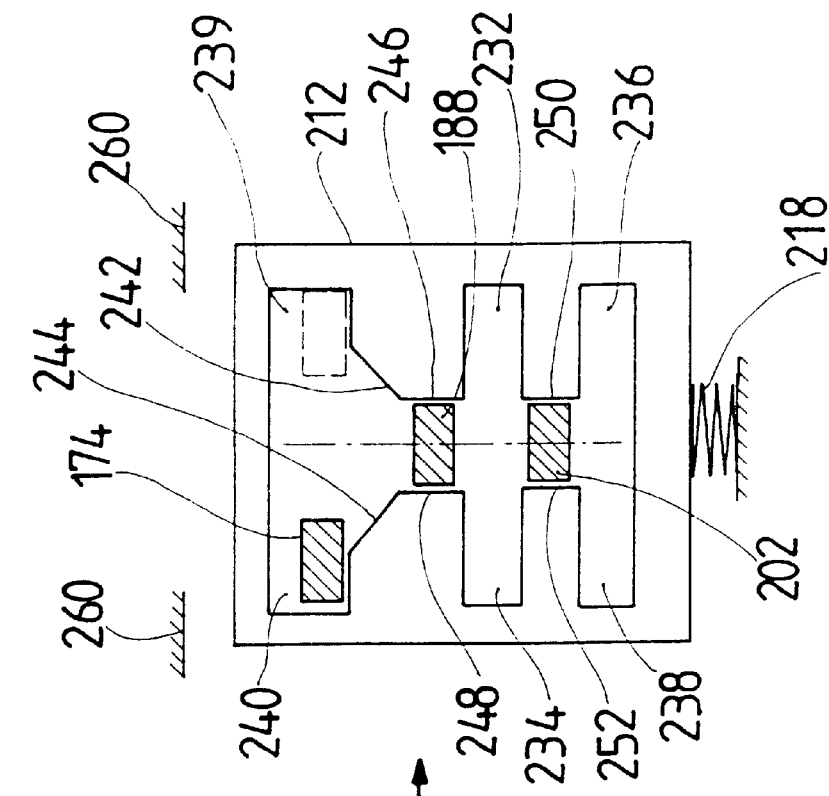
FIGS. 8 to 10 show operational diagrams of the safety sleeves assigned to different actuator units.
Figure 8B:
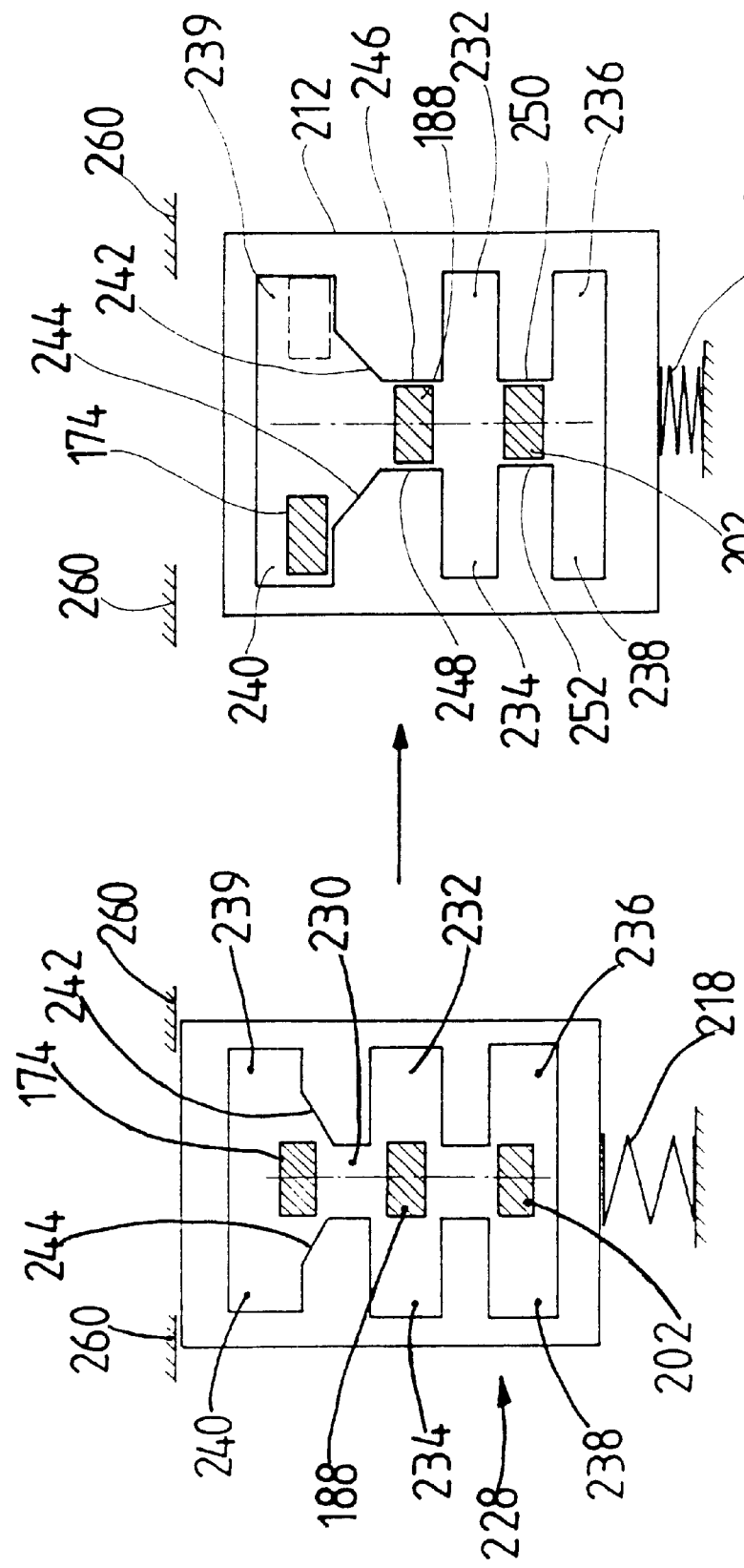

FIG. 1 shows an automatic transmission according to the invention which is designated generally by 10. The transmission 10 has a transmission input shaft 12 which can be coupled, via a clutch 14, with a drive shaft 16, for example, a crankshaft of an internal combustion engine, so as to be fixed with respect to rotation relative to it. The transmission input shaft 12 can be put into a torque transmission connection with a transmission output shaft 18 via a plurality of torque transmission paths 1., 2., 3. and 4., wherein the transmission output shaft 18 is coupled, via a driven gearwheel 20, with a differential 22 which in turn drive units or has driving shafts 24, 26. As will be described in detail hereinafter, each torque transmission path 1.–4. has an input gearwheel 28, 30, 32, 34 which can be coupled, as selected, with the input shaft 12 so as to be fixed with respect to rotation relative to it and an output gearwheel 36, 38, 40, 42 which is coupled, or can be coupled, with the transmission output shaft 18 so as to be fixed with respect to rotation relative to it. In the embodiment shown in the drawing, the respective input gearwheels 28, 30, 32, 34 mesh with the associated output gearwheels 36, 38, 40, 42. Of course, additional gearwheels which are rotatable at an intermediate shaft can be provided between these pairs of gearwheels in order to achieve determined speed reduction ratios. It will be further assumed hereinafter that the torque transmission path 1. which has the smallest input gearwheel 32 and the largest output gearwheel 40 is the first gear speed of the transmission 10 and that the torque transmission path 4. having the largest input gearwheel 30 and the smallest output gearwheel 38 is the fourth, that is, the highest gear speed. Accordingly, this means that, in the transmission according to the invention, the torque transmission paths 1., 2., 3., 4. and the associated gear speeds in this sequence with respect to the speed reduction ratios provided by these individual torque transmission paths can be ordered in a sequence in which, in the direction of descending speed reduction ratio, the first torque transmission path 1. is at the beginning of the sequence, followed by the second torque transmission path 2., the third torque transmission path 3., and the fourth torque transmission path 4. Accordingly, in this sequence, in ascending numerical order, the immediately following torque transmission path has a smaller speed reduction ratio, i.e., a higher output speed at the same input speed, than a torque transmission path immediately preceding it. This shows that, within the meaning of the present text, the designation "immediately following" or "immediately preceding" indicates that there is no other torque transmission path of the sequence between two such torque transmission paths.

In the transmission 10, the torque transmission paths 1., 2., 3. and 4. are divided into two groups G1 and G2. Group G1 has the first and the third torque transmission path 1., 3., and group G2 has the second and the fourth torque transmission path 2., 4.. A clutch unit 44 and 46, respectively, which will be described in more detail in the following is associated with each of these groups G1 and G2 and by means of appropriate control, as selected, can activate one of the torque transmission paths of this group while deactivating the other. Accordingly, this means that either the first gear, i.e., the first torque transmission path 1., or the third gear, i.e., the third torque transmission path 3., can be activated by the clutch unit 44, whereas the second gear, i.e., the second torque transmission path 2., or the fourth gear, i.e., the fourth torque transmission path 4., can be activated by the clutch unit 46. Of course, each of the clutch units 44, 46 can also be put into a neutral position in which none of the torque transmission paths that can be activated by the respective clutch unit 44 or 46 is actually activated. Depending on the clutch unit 44, 46 which has been moved out of the neutral position and depending on the direction of the deflection from the neutral position, one of the four torque transmission paths 1. to 4. is activated.

In order to put the individual clutch units 44, 46 into operation for achieving the above-mentioned function, an actuator unit 48, 50, respectively, is associated with each of these clutch units and realizes the required function of the clutch units 44, 46. This means that the actuator units 48, 50 are under the control of a control device, not shown, and, depending on the given actuation of a shift lever carried out by the driver or by means of an automatic program, one of the actuator units 48, 50 is controlled so as to disengage a previously activated gear speed or a previously activated torque transmission path and one of the actuator units 48, 50 is controlled so as to activate a gear speed to be adjusted thereafter or a torque transmission path to be adjusted thereafter.

In general, when carrying out shifting processes, it is to be assumed that a shifting sequence is carried out in the order defined above. That is, it is assumed that shifting is carried out, for example, from first gear to second gear, from second gear to third gear, and from third gear to fourth gear or in the reverse sequence. If such a shifting process is to be carried out, e.g., from first gear to second gear, i.e., the first torque transmission path 1. must be deactivated and the second torque transmission path 2. must be activated, the actuator unit 48 is controlled in such a way that it is moved out of an operating position in which the engagement gearwheel 32 is coupled to the input shaft 12 into its neutral position in which there is no longer a rotational coupling of the input gearwheel 32 to the input shaft 12. Simultaneously, or after a slight delay as the case may be, the actuator unit 50 can be controlled in order to move the clutch unit 46 out of its neutral operating position into a position in which the input gearwheel 28 of the torque transmission path 2. is coupled with the input shaft 12 so as to be fixed with respect to rotation relative to it. Accordingly, it will be seen that this shifting process can be carried out very quickly because the two torque transmission paths 1. and 2. involved in the shifting process can be activated by different clutch units 44 and 46 and, moreover, these clutch units 44 and 46 are operated by means of autonomous actuator units 48, 50. Accordingly, it is not necessary to wait until the first torque transmission path 1. is completely disengaged in order to be able to activate the second torque transmission path 2. subsequently as in the prior art. Further, because of these shifting procedures which are to be carried out in an appreciably shorter time, the period of time during which the transmission of torque via the transmission 10 is completely interrupted is appreciably reduced, so that shifting convenience can also be improved.

It is noted that the effect addressed above can be utilized in all shifting procedures occurring in the normal shifting sequence predetermined by the defined sequence, regardless of whether ascending shifting or descending shifting is to be carried out.

For the sake of completeness, it is noted that the transmission 10 also has a reverse gear speed R. which defines a torque transmission path for driving in reverse. This reverse gear speed R. has an input gearwheel 52 which is coupled with the input gearwheel 30 of the fourth gear speed and fourth torque transmission path 4. so as to be fixed with respect to rotation relative to it and is in a torque-transmitting connection with an output gearwheel 56 via an intermediate gearwheel 54. It will be seen that a connection unit 58 is provided which, when the reverse gear speed R. is activated, is moved toward the left out of the position shown in FIG. 1 in which the output gearwheel 38 of the fourth torque transmission path 4. is coupled to a connection gearwheel 60 of the output shaft 18 so as to be fixed with respect to rotation relative to it into a position in which the output gearwheel 56 of the reverse gear speed R. is coupled to the output shaft 18. Since it is generally assumed that a gear change from reverse gear only takes place to first gear, that is, to the first torque transmission path 1., or in the reverse direction, it is also possible in this case, by means of the assignment of the reverse gear speed R. to group G2, to benefit from the above-mentioned minimized time required for carrying out shifting procedures. Accordingly, within the meaning of the present invention, group G2 is expanded by the reverse torque transmission path R. and therefore comprises three torque transmission paths, wherein the connection unit 58 for activating this reverse torque transmission path is to be controlled jointly with the actuator unit 50 and is therefore to be considered as forming a unit with the latter. With reference to the sequence defined in the foregoing, the reverse gear speed R. could be at the start, that is, before the first torque transmission path 1.

The above-mentioned advantage of the present invention is accordingly achieved in that every group of torque transmission paths contains only those torque transmission paths which do not directly follow one another in order of the above-defined sequence. In the same way, each of the above-mentioned groups of torque transmission paths has different torque transmission paths which follow one another in sequence, i.e., a first torque transmission path of a group precedes a second torque transmission path assigned to this group in the order defined by the sequence and the latter torque transmission path can, as the case may be, precede a third torque transmission path assigned to this group in the order defined by the sequence. Accordingly, within the meaning of the present text, this first torque transmission path and second torque transmission path would be considered as torque transmission paths contained in the group which follow one another in order of the sequence, but which do not follow one another directly, as is also the case for the second torque transmission path and the third torque transmission path of this group.

Different embodiments of actuator units and clutch units of the type mentioned above are described in the following with reference to FIGS. 2 to 5. However, it is noted that the principle of the present invention is not dependent on the concrete embodiment of the actuator units or that of the clutch units. The clutch unit can be any type of friction clutch that can provide a coupling between different transmission members such that the latter are fixed with respect to relative rotation, wherein these transmission members are shown herein in the form of gearwheels but which could also be belt connections.

FIG. 2 shows a clutch unit of the type mentioned above, for example, clutch unit 44, by means of which either the input gearwheel 32 or the output gearwheel 34 can be coupled to the transmission input shaft 12, not shown, so as to be fixed with respect to rotation relative to it. This clutch unit 44 has a driver gearwheel 60, 62 associated with each gearwheel 32, 34 and connected with the latter so as to be fixed with respect to rotation relative to it, for example, by means of a toothing. Each of these driver gearwheels 60, 62 has a driver toothing 64, 66 on the radial outer side, wherein a synchronizing ring 68 engages therein by an internal toothing 70 when a corresponding gear speed is activated. Further, a synchronizing gearwheel 70 and 72, respectively, is associated with each driver gearwheel 62. Each driver gear wheel 60, 62 has a portion 74 and 76, respectively, which tapers in the shape of a truncated cone and every synchronizing gearwheel 70, 72 has a correspondingly tapering central opening 78, 80.

A driver element 82 is connected with the transmission input shaft 12 so as to be fixed with respect to rotation relative to it and is connected again with a clutch element 85 so as to be fixed with respect to rotation relative to it. On the radial outer side, the clutch element 85 has a toothing, not shown, which extends in the direction of the transmission input shaft and which meshes in an axially displaceable manner with the toothing 70 of the synchronizing ring 68. In this way, a connection is provided between the synchronizing ring 68 and the transmission input shaft such that they are fixed with respect to rotation relative to one another. Further, each gearwheel 70, 72 has an external toothing 84, 86 which is provided at the side facing the synchronizing ring 68 with respective circumferential inclined surfaces 88, 90. In a corresponding manner, the internal toothing 70 of the synchronizing ring 68 has, at its axial ends, respective inclined surfaces 92, 94; that is, the teeth of the respective toothings 70, 84, 86 are constructed so as to taper at their respective end areas located in the axial direction. Further, the width of the synchronizing ring 86 is such that the inclined tooth areas 92, 94, 90, 88 mesh with one another in the neutral position shown in the Figure, in which position none of the teeth 32, 34 are coupled to the transmission input shaft 12.

When the gearwheel 32 is to be coupled to the transmission input shaft proceeding from the position of the gearwheel 32 shown in the drawing, for example, a force is exerted on a shifting claw, designated generally by 96, by means of the schematically indicated actuator unit 44, which force displaces the shifting claw in the direction of arrow R, that is, toward the left in FIG. 2. The shifting claw 96 engages in a recess 98 of the synchronizing ring 68 in the axial direction in a positive engagement and therefore carries the latter along during this movement in direction R. Due to the inclined surfaces 92, 88 which contact one another and due to the fact that the clutch gearwheel 70 is also carried along in rotation by the rotating synchronizing ring 68, a force is exerted on clutch gearwheel 70 during this movement in direction R which also presses the clutch gearwheel 70 in direction R. At the same time, the synchronizing ring 68 is displaced with its toothing 70 in the toothing 84 of the gearwheel 70. Because of the generated axial force, the clutch gearwheel 70 is pushed onto the conical portion 74 by its opening area 78, so that a frictional force is generated which produces a rotational coupling of the driver gearwheel 60, and, accordingly, the input gearwheel 32, with the clutch gearwheel 70. Accordingly, the rotational synchronization between the driver gearwheel 60 and the clutch gearwheel 70 is finally achieved in this way. When the claw 96, and, therefore, the synchronizing ring 68, is moved farther in direction R, this synchronizing ring 68 also enters into the toothing 64 of the driver tooth 60 aided by the inclined surface or inclines surfaces 92, wherein this entry is further facilitated by inclined surfaces 100 provided at the toothing 64. The input gearwheel 32 is then coupled to the transmission input shaft so as to be fixed with respect to relative rotation via the driver gearwheel 60, the synchronizing ring 68 and elements 85 and 82.

In order to ensure that the synchronizing ring 68 is not deflected as a result of vibration in the neutral position when the actuator unit arrangement 44 is not excited, a pretensioning arrangement 102 is provided. This pretensioning arrangement 102 includes a pushrod 104 which engages by a spherical end 106 in a V-shaped circumferential groove 108 of the synchronizing ring 68. The pushrod 104 is pretensioned in a recess 103 in the elements 82, 85 by a pretensioning spring 110 in the direction of the synchronizing ring 68. When a shifting process is carried out, i.e., during the movement of the synchronizing ring 68 in the direction of the transmission input shaft 12, the pushrod 104 is moved through the V-shape of the groove 108 by its spherical end 106, which can also be constructed as a separate engagement ball, out of engagement with the synchronizing ring 68. When the synchronizing ring 68 moves back into the position shown in the Figure, the pushrod 104 engages in the groove 108 again by its spherical end 106 and accordingly secures the synchronizing ring 68 in the neutral position. It is noted that it is not necessary to achieve a fixing of position in the neutral position by means of a pushrod and an associated spring. Rather, it is also possible to provide a self-locking drive, for example, in the form of a self-locking toothing formed by a worm gear. An arrangement of this kind is compulsorily held in a respective position by the self-locking toothing when there is no corresponding driving torque from the driving motor.

FIGS. 3 and 5 show different constructions of the actuator unit 48, 50 shown in FIG. 1. Since these actuator units 48, 50 can be identically constructed, a description of the actuator unit 48 will be omitted in the following. It will be seen that the shifting claw 96 has, in its area remote of the synchronizing ring 68, a recess 112 in which one end 114 of an actuating lever 116 engages, this end 114 being widened in the manner of a ball joint. This actuating lever 116 is swivelable about a swiveling axis S which is positioned orthogonally, but in a skew line, with respect to the transmission input shaft 12. The lever 116 has, in its other end area 118, a segment-shaped toothing 122 with which a driving pinion 124 of an electric motor 126, e.g., a brushless electric motor, meshes. When the electric motor 126 is excited, the lever 116 is driven in a swiveling movement about the axis S and the shifting claw 96 moves on a guide shaft 128 in the above-mentioned direction R in order to couple one of the gearwheels 32, 34 to the transmission input shaft so as to be fixed with respect to rotation relative to it.

In the embodiment form according to FIG. 4, the shifting claw 96 has a toothing portion 130 in its outer area, wherein the driving pinion 124 of the electric motor 126 meshes with this toothing portion 130. Accordingly, the force transmission by means of a lever, as shown in the embodiment form according to FIG. 3, does not take place in this case; rather, the rotating movement of the electric motor 126 is converted directly into a displacing movement in the shifting claw 96 along the guide shaft 128.

FIG. 5 shows an embodiment form in which the shifting force which is required for the displacement of the claw 96 is generated by a double-acting piston-cylinder unit 132. This piston-cylinder unit 132 comprises a cylinder housing 134 in which a piston 136 is guided in a sealed manner. The piston 136 is coupled with a piston rod 138 which is coupled at the other end with the claw 96 for displacement of the same. The piston-cylinder unit 132 is preferably double-acting and has fluid feed/fluid discharge openings 140, 142. Each of these openings 140, 142 is in a fluid transfer connection with a space region 144, 146 of the interior of the cylinder housing 134 which is divided by the piston 36 into two spaces. Depending on the space areas 144, 146 in which the fluid is fed and from which fluid is removed, the piston 136 and the piston rod 138 connected therewith moves again in direction R, so that the corresponding movement of the synchronizing ring 68 is generated again. The piston-cylinder device can be a hydraulic or pneumatic piston-cylinder device whose working pressure can be taken from a hydraulic or pneumatic system, for example, which is often provided especially in commercial vehicles. In this case, it is only necessary to control appropriate valves which interrupt and release lines leading to the openings 140, 142. As an alternative to the double-acting cylinder, it is also possible, of course, to provide two single-action cylinders.

Further, it is noted that, although these are not shown, many other drive types for generating the shifting force are possible. For example, an armature which is coupled with the claw 96 can be displaced via an electric magnet by excitation of its windings, or it is possible to provide piezo actuators which induce the corresponding movement.

The preceding description has concerned an automatic transmission in which a very fast shifting process which is convenient to carry out can be achieved due to the grouping of different torque transmission paths in respective groups and the activation of the torque transmission paths from respective groups by means of a respective clutch unit. It is important that gear speeds which follow one another directly are not in one and the same group in a given sequence which is generally defined by how the individual gear speeds or torque transmission paths are to be activated one after the other in normal shifting behavior. According to the invention, this means that one clutch unit cannot serve to engage, for example, both the first gear and the second gear assuming that the shifting sequence is normally 1st gear, 2nd gear, 3rd gear, 4th gear, and so forth. Accordingly, this means that a group does not contain two torque transmission paths which are to be activated one after the other when carrying out normal shifting processes.

As can further be seen particularly from FIG. 1, the groups need not necessarily contain the same number of gear speeds, i.e., torque transmission paths. It will be seen that group G2 contains two forward driving speeds as well as one reverse driving speed. It is also conceivable that the transmission has a total of five or six forward gear speeds and that, for example, the fifth gear speed is associated with group G1 and the sixth gear speed, if any, is associated with group G2. It is also conceivable in principle that in a transmission with only three gears, i.e., three torque transmission paths, one group contains two gear speeds, i.e., torque transmission paths, and the other group contains only one individual torque transmission path. Within the meaning of the present invention, this means that one group need not necessarily contain a plurality of members; a group can also contain only one individual member.

In this sense, it is also possible, in principle, according to the present invention that every group contains only one individual member, that is, one individual torque transmission path. In this regard, every torque transmission path can be activated and deactivated by a separate clutch unit and, as the case may be, a separate actuator unit. Moreover, in a construction of this type, it is possible to skip gears, e.g., to skip from second gear to fourth gear, and vice versa, with the same advantages as those mentioned above, i.e., a very fast and convenient shifting process can be achieved even when skipping a gear speed.

This can also be achieved in an arrangement such as that shown in FIG. 1, i.e., in an arrangement in which two gears are to be operated by one clutch unit. For example, it can be provided in a five-speed transmission that a first group comprises the torque transmission paths for the first and fourth gears, that a second group comprises the torque transmission paths for the second and fifth gears, and that a third group comprises the torque transmission paths for the third gear and reverse gear. In the case of a six-speed transmission, the sixth gear can also be contained in the third group. It will be seen that there are located in every group between the gears contained herein, which are to be considered in the order of the shifting sequence defined in the beginning as two successive gears, two torque transmission paths or gear speeds that are not contained in this group but in another group. As a result, for example, when it is necessary or desired to shift from fourth gear to second gear, the fourth gear is deactivated by the clutch unit associated with the first group and the second gear is activated by the clutch unit associated with the second group in contrast to the embodiment form shown in FIG. 1 in which both the fourth gear and the second gear are to be operated by the same clutch unit. Accordingly, passing can be carried out in an appreciably faster manner because even when individual gear speeds are skipped a shifting process in which only one individual clutch unit is involved is prevented. For this purpose, in order to minimize the required clutch units with respect to a given number of gear speeds, the embodiment form in which between two gear speeds or torque transmission paths of a group, with reference to the defined sequence, there are located two other torque transmission paths is preferred because it is not generally anticipated that more than one gear speed will be skipped. This means that it is generally not anticipated that shifting will be carried out from fourth gear to first gear, or vice versa.

Various other embodiment forms of transmissions and actuator units for automatic shift transmissions which can be applied in connection with clutch units shown in FIG. 3 are described with reference to FIGS. 6 to 18. FIGS. 6 to 14 refer to a first embodiment form of a transmission 10 having five forward gears and one reverse gear. It is noted that, particularly in FIG. 6, only those portions of the transmission or transmission housing 150 relevant for explaining the present invention are shown.

In the transmission 10 shown in FIG. 6, there are three actuator units 152, 154 and 156 by means of which respective clutch units, which were shown, e.g., in FIG. 2 and described with reference to FIG. 2, can be actuated for activating one of two possible gear positions or torque transmission paths associated with these gear positions. This means that each of these clutch units can have a shifting claw or shifting fork which can be actuated by the associated actuator units 152, 154, and 156 and by means of which a synchronizing device can be actuated.

It will be seen in FIG. 6 that each of the actuator units 152, 154 and 156 has a drive, for example, an electric-motor drive, 158, 160 and 162. Further, each of the actuator units 152, 154 and 156 has a transmission shaft arrangement. Accordingly, the actuator unit 152 has a transmission shaft unit, designated generally by 164, which comprises a hollow shaft portion 166. This hollow shaft portion 166 is rotatable in a bearing and seal arrangement 168 of the transmission housing 150 and is mounted so as to be substantially liquid-tight. At its portion projecting out of the transmission housing 150, this hollow shaft portion 166 has a segment gearwheel portion 170 which meshes with a driving gearwheel 172 of the drive unit 158. At its end area located in the transmission housing 150, the hollow shaft portion 166 has a shifting finger, designated by 174, which is in an actuating engagement directly with an associated shifting claw, as was described above, or which serves, via a driver element 176, to displace a shaft part 178 which is connected with the latter and which is displaceable along an axis orthogonal to the drawing plane in the view shown in FIG. 6 when the hollow shaft portion 166 rotates and the shifting finger 174 is accordingly swiveled. This shaft part 178 can then fixedly carry the shifting claw associated with a respective clutch unit.

A second transmission shaft arrangement 180 having a hollow shaft portion 182 which is arranged coaxial to the hollow shaft portion 166 and located therein is associated with the actuator unit 156. In its portion projecting out of the hollow shaft portion 166 and located outside of the transmission housing 150, the hollow shaft portion 182 also has a segment gearwheel 184 meshing with a driving gearwheel 186 of the drive 162. In its other end area located in the transmission housing 150, the hollow shaft portion 182 carries a shifting finger 188 which can displace a shaft part 192 in its longitudinal direction via a driver element 190. The shaft part 192 also carries a shifting claw or shifting fork of an associated clutch unit.

A transmission shaft arrangement 194 of the actuator unit 154 extends in the hollow shaft portion 182. This transmission shaft arrangement 194 comprises a shaft portion 196 which again carries, in its portion projecting out of the hollow shaft portion 182, a segment gearwheel 198 which meshes with a gearwheel 200 of the drive unit 160. In its other end portion, the shaft portion 196 is rotatably supported at the clutch housing 150 or at a component fixedly connected therewith and carries in the vicinity of the rotatably supported area a shifting finger 202 which can displace a shaft part 206 in its longitudinal direction during a rotating movement of the shaft portion 196 via a driver element 204. The shaft part 206 also carries a shifting claw of an associated clutch unit.

It is noted that the hollow shaft portions 166 and 182, which are nested one inside the other coaxially, and the shaft portion 194 can be supported against one another and, among other things, can be sealed relative to one another in a fluid-tight manner. It is further noted that the individual segment gearwheel portions 170, 184 and 198, respectively, can be connected with the respective hollow shaft portions 166, 182 and the shaft portion 196 after the individual hollow shaft portions and shaft portions 166, 182, 196 are slid one inside the other, wherein the entire arrangement of hollow shaft portions and shaft portions which are slid one inside the other is inserted beforehand into the bearing unit 168.

The embodiment form shown in FIG. 6 in which two torque transmission paths can be activated by three clutch units is constructed in a particularly advantageous manner so as to be integrated in conventional transmissions which are designed for manual shifting. In this case, that is, only the mainshaft which is generally provided in transmissions of the type mentioned above and which is guided through the transmission housing and is rotatable and displaceable in a linear manner for controlling different clutch units needs to be replaced by shaft portions 166, 182, 196 which are nested one inside the other. Essentially no additional steps need be provided for adaptation. Depending on which drive units 158, 160, 162 are excited, one of the shaft parts 178, 192, 206 can be displaced for actuating an associated clutch unit. For example, the drive 158 can be controlled for disengaging a gear speed and another drive can be controlled for engaging another gear speed virtually simultaneously. It will be seen that there is essentially no mechanical coupling between the individual actuator units 152, 154, 156. This means that these actuator units 152, 154, 156 can be operated completely independent from one another. However, this entails the risk that in the event of incorrect control when a gear speed is already activated by one of the actuator units, another actuator unit will attempt to act on an associated clutch unit for activating a gear speed. This could result in damage to a transmission. In order to avoid this, a safety arrangement 210 shown in FIG. 6 compulsorily ensures that when a gear speed is activated another gear speed cannot be activated at the same time. The safety arrangement 210 comprises three safety sleeves 212, 214, 216 which extend coaxial to the shaft portions 166, 182 and 196 and are nested one inside the other. Each of these safety sleeves 212, 214, 216 is pretensioned toward the top, with reference to FIG. 6, by an associated spring 218, 220, 222. Further, the safety sleeves 212, 214, 216 have recesses 224 in the form of elongated holes, wherein an anti-rotation pin 226 which is secured to the housing 150 or to a component connected with the latter engages in these recesses 224. In this way, the safety sleeves 212, 214, 216 are secured against rotation.

FIG. 7 shows a perspective view of the safety sleeve 212 associated with the actuator unit 152, that is, the transmission shaft arrangement 164 or the shifting finger 174. It will be seen that the safety sleeve 212, as well as the other safety sleeves 214, 216, have a gate-type recess configuration 228 through which the shifting fingers 174, 188, 202 project. This gate-type recess configuration 228 has a central through-pass region 230 which extends substantially parallel to the shaft portions 166, 182, 196 and from which recess portions 232, 234, 236 and 238 extend away toward the two circumferential sides, wherein these recess portions 232, 234, 236 and 238 are associated with the shifting fingers 188, 202 and extend approximately around the shaft portions 166, 182, 196. The portions 232, 234, 236, 238 are situated at a height corresponding to the position of the shifting fingers 188 and 202, respectively. Also, through-portions 239 and 240 extending lateral to the passage area 230 are associated with the shifting fingers 174, but are situated slightly higher than the shifting finger 174 in the neutral position of the shifting finger 174 shown in the drawing. In this neutral position, inclined surface portions 242, 244 are located on both sides of the shifting finger 174. This situation is also shown in a schematic view in FIG. 8a. When the actuator unit 152 is driven proceeding from this neutral position in order for the shifting finger 174 to actuate a clutch unit associated with this shifting finger 174, the shifting finger 174 rotates in lateral direction to the right or left side in the view shown in FIG. 8a and, in so doing, contacts one of the inclined surface areas 242, 244. Due to the displacement force occurring as a result of this, the safety sleeve 212 is displaced against the force effected by the spring 218 and, when a gear speed has been activated by the associated clutch unit, occupies the position shown in FIG. 8b. In this position, the shifting fingers 188, 202 are no longer aligned with the respective through-portions 232, 234, 236, 238; rather, blocking portions 246, 248, 250, 252 are now located opposite the shifting fingers 188, 202 in the lateral direction, these blocking portions 246, 248, 250, 252 being formed in the respective displacement direction of the safety sleeve 212 between the through-pass portions 238 and 232, through-pass portions 240 and 234, through-pass portions 232 and 236, and through-pass portions 234 and 238. In this position, the respective associated shifting finger 188, 202 cannot be moved in an undesired manner by any of the actuating drive units 154, 156, so that, after the safety sleeve 212 is activated, it is ensured in a compulsory manner that only one gear speed is engaged and remains engaged. Not until the shifting finger 174 has been returned to the position shown in FIG. 8a and the safety sleeve 212 has returned to the deactivated position shown in FIG. 8a can another shifting finger 188, 202 or the same shifting finger 212 be moved for activating an associated gear speed.

Figures 9A, 9B:
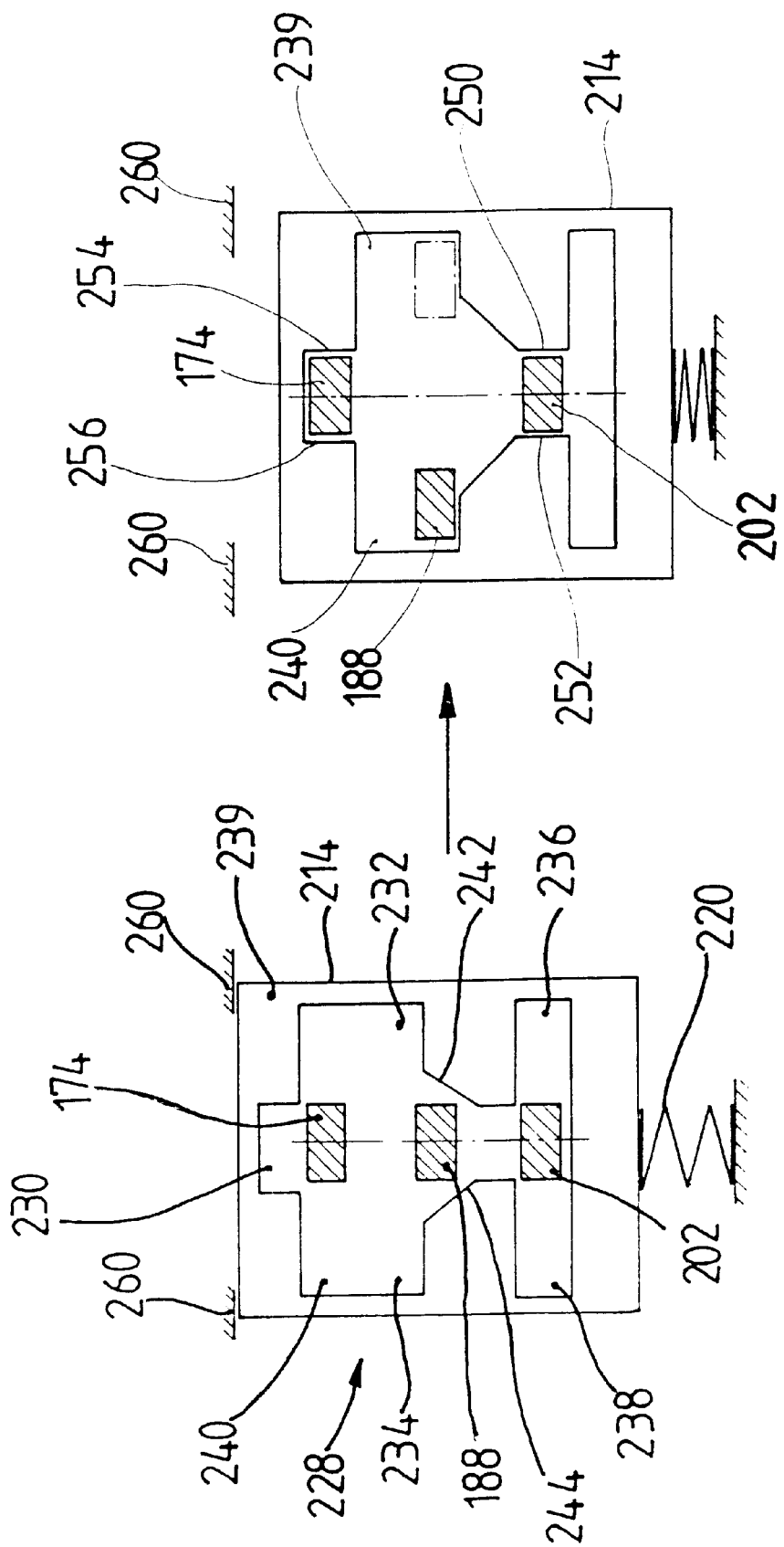

FIG. 9 shows the functional diagram and construction of the safety sleeve 214 which is associated with the actuator unit 154. It will be seen that lateral through-pass portions 232, 234, 236, 239, 240 associated with the shifting fingers 174, 188, 202 and branching off in both directions from the middle through-pass portion 230 are also provided in this case, wherein it can be seen that there is no dividing web between the through-pass portions 232 and 239 or through-pass portions 234 and 240. The inclined surface areas 242, 244 are now oriented in the neutral position with the shifting finger 188. When this shifting finger 188 is moved in the lateral direction, it abuts against one of the inclined surface areas 242, 244 and, as the movement continues, pushes the safety sleeve 214 against the action of the spring 220 into its activation position shown in FIG. 9b. The shifting finger 202 is then located between the two blocking portions 250, 252. The shifting finger 174 is located between the blocking portions 254, 256 associated therewith. Only after the shifting finger 188 has been returned to its neutral position in which it is oriented in the longitudinal direction of the associated shaft portion with the other shifting fingers 174 and 202 can another shifting finger be moved or the same shifting finger 188 be moved again for activation of a gear speed.

Figure 10B:
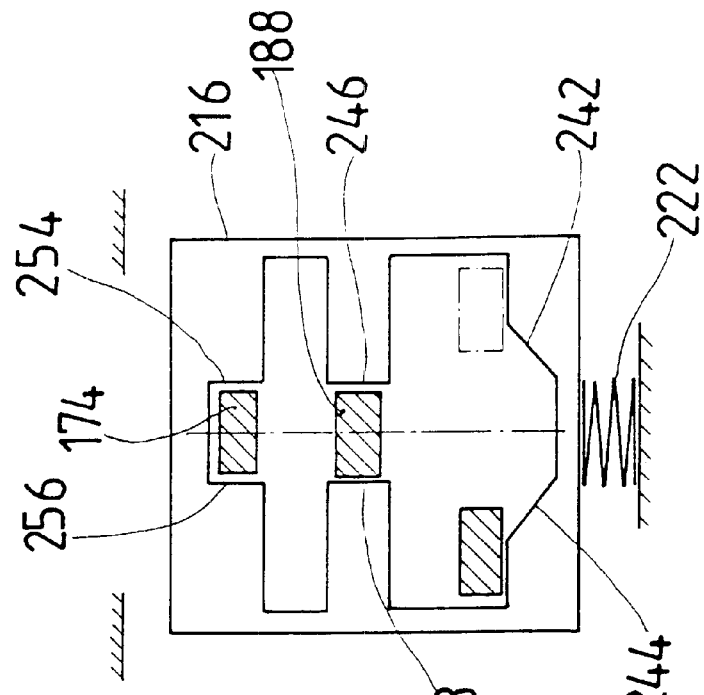
Figure 10A:
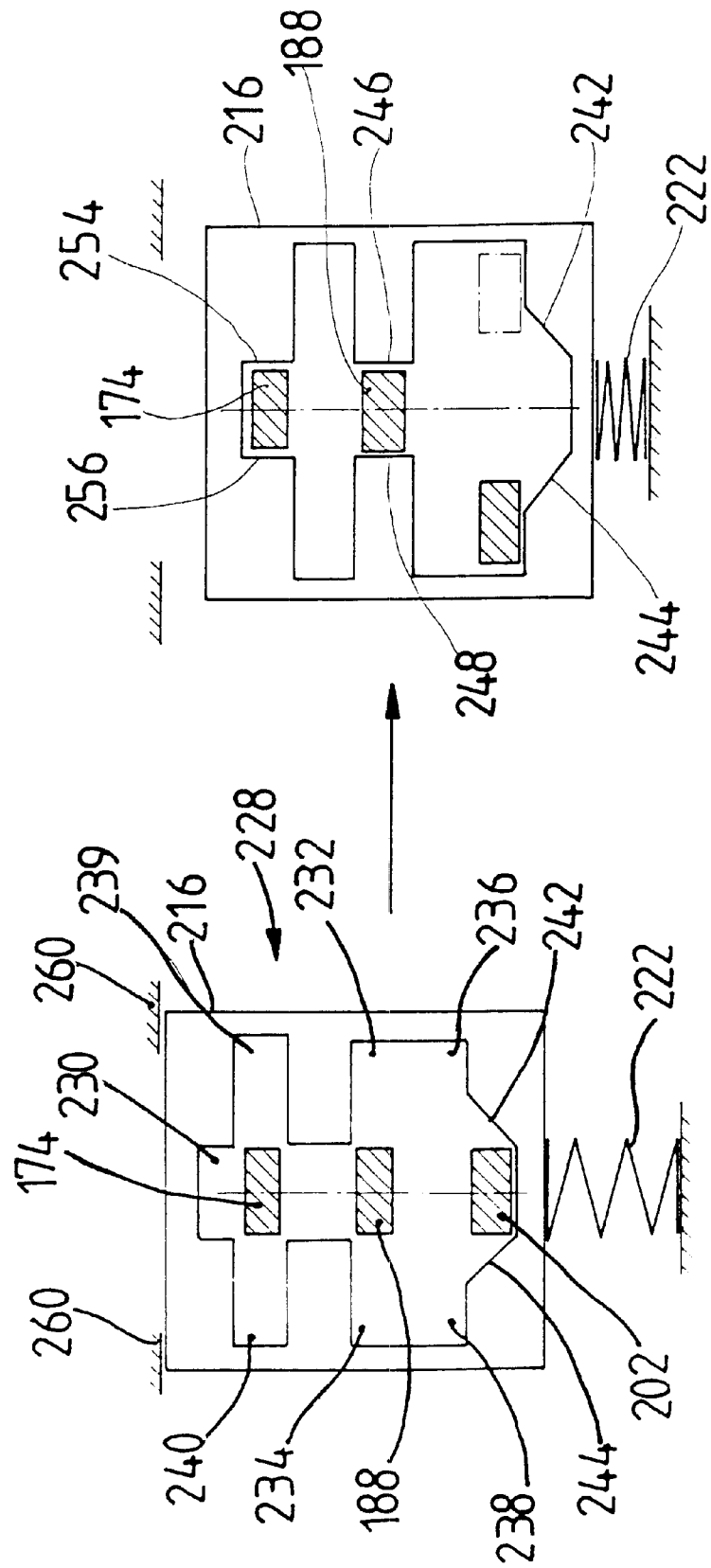

Finally, FIG. 10 shows the functional diagram and the basic construction of the safety sleeve 216 associated with the actuator unit 156. In the neutral position of the three shifting fingers 174, 188, 202 shown in FIG. 10a, the two inclined surface portions 242, 244 extend laterally alongside the shifting finger 202. When the shifting finger 202 is swiveled, it displaces the safety sleeve 216 against the action of the spring 222 in cooperation with one of the inclined surfaces 242, 244 in such a way that the two shifting fingers 174, 188 are located between the respective associated blocking portions 254, 256, 246, 248 as can be seen in FIG. 10b.

It is noted that in the safety sleeves 212, 214, 216 the respective blocking portions 246, 248, 250, 252, 254, 256 are wall areas which define the through-pass area 230 in the lateral direction and which are situated in a location where no lateral through-pass portions 232, 234, 236, 238, 239, 240 branch off from the through-pass area 230 and where there are no inclined surfaces 242, 244. Further, it is noted that the radial offsetting of the safety sleeves associated with the different actuator units 152, 154, 156 need not conform to the preceding description. For example, the safety sleeve associated with the actuator unit 152 could also be the safety sleeve 216 positioned in the extreme position. Further, it is noted that the stop action opposing the spring pretensioning of the springs 218, 220 and 222 can be formed either by the retaining pin 226 and/or by the end area of the through-pass area 230 in the different safety sleeves which is located close to the springs. Also, as is indicated in FIGS. 8 to 10, another stop 260 can be provided so as to be fixed with respect to the housing.

Figure 11:
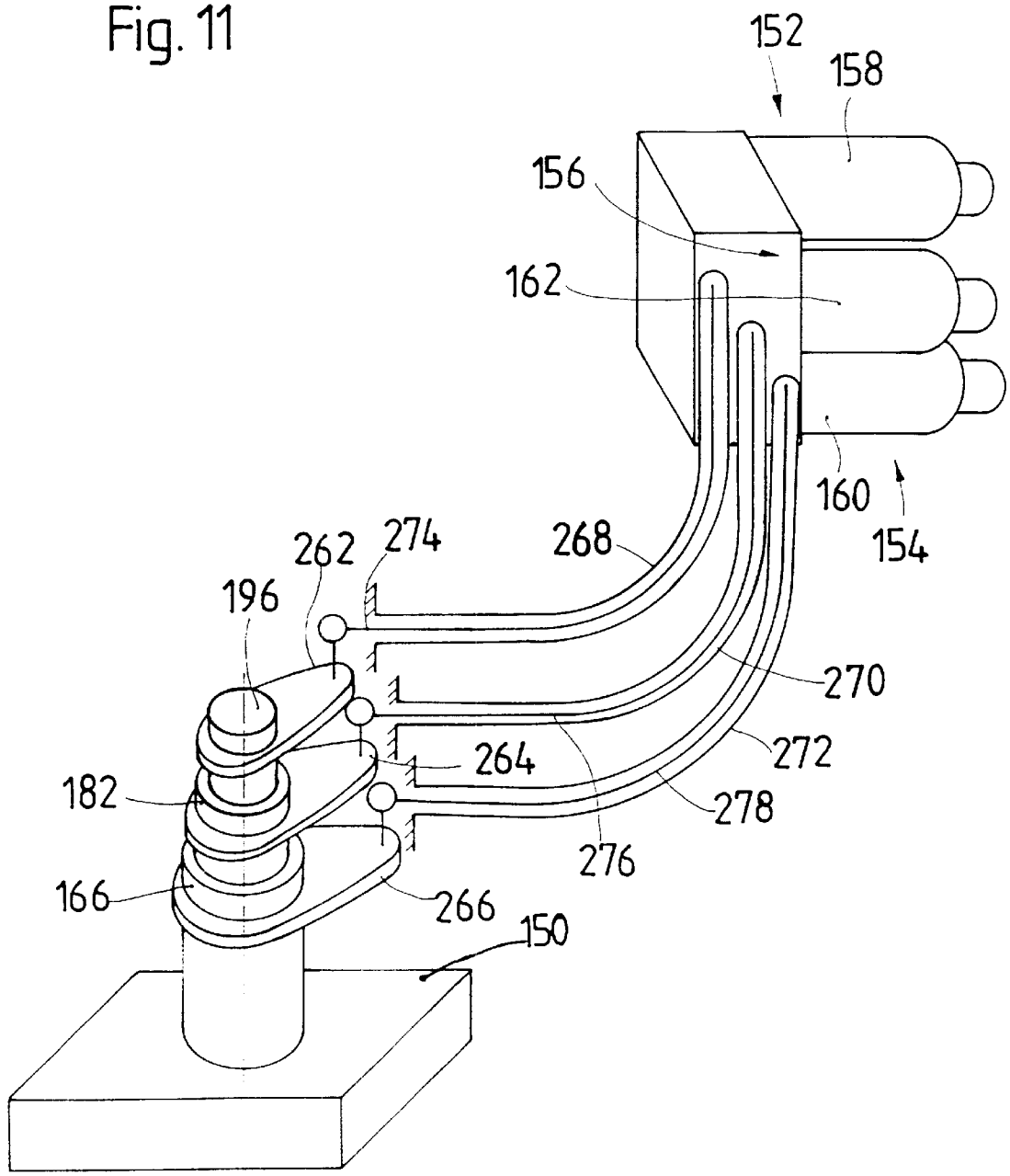
FIG. 11 shows a modification of the embodiment shown in FIG. 6.

FIG. 11 shows a modification of the embodiment form shown in FIG. 6, wherein a different force coupling is provided in this case between the individual drive units 158, 160, 156 and the shaft portions 166, 182, 196. It will be seen that each of the shaft portions 166, 182, 196 carries lever elements 262, 264 and 266 in their end areas projecting out of the clutch housing 150. These lever elements are coupled with the associated drive units 158, 160, 162 by force transmission elements, for example, Bowden cable cores 274, 276, 278 extending in Bowden cable jackets 268, 270, 272. The other ends of the Bowden cable cores 274, 276, 278 can be coupled to segment gearwheels, for example, which in turn mesh with gearwheels driven by drive units 158, 160, 162. The advantage of this embodiment form consists in that the drive units 158, 160, 162 can be optionally spatially separated from the transmission itself.

Figure 12:
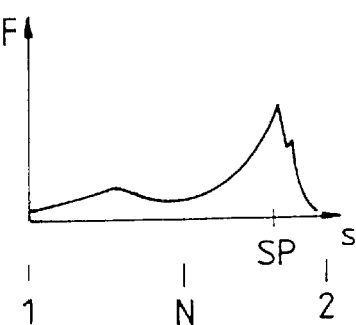
FIG. 12 shows a force diagram which represents the shifting force to be applied when shifting from a first gear to a second gear.
Figure 13:
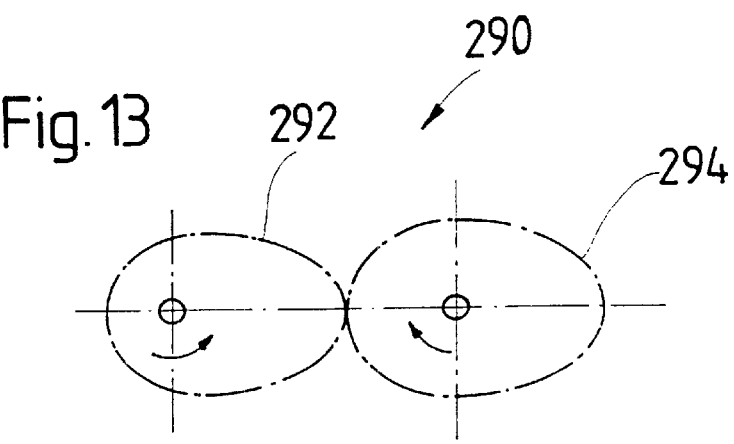
FIG. 13 shows a schematic view of a transmission arrangement which makes it possible to adapt to the force curve shown in FIG. 12.
Figure 14:
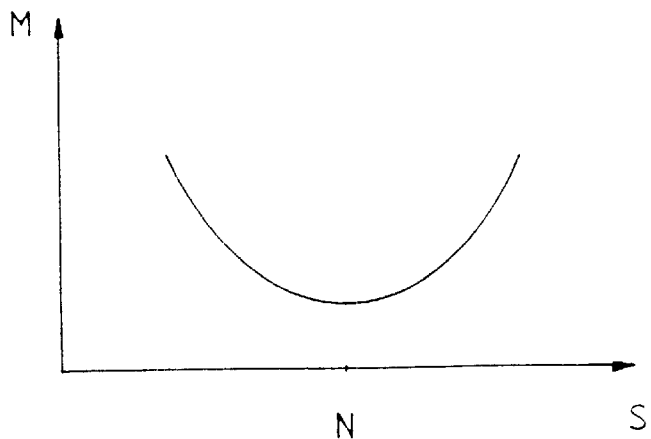
FIG. 14 shows the torque obtained through the transmission arrangement of FIG. 13 depending on the shifting path.

When shifting processes are carried out, i.e., when activating or deactivating torque transmission paths by means of clutch units as shown, for example, in FIG. 2, there results a shifting force curve like that shown by way of example in FIG. 12 for a shifting process from first gear to second gear. It will be seen that a relatively slight increase in the required shifting force F occurs at first during the transition from the state in which first gear is activated to the neutral position N, wherein the shifting force F decreases again toward the neutral position. During the movement from the neutral position to the position in which second gear is activated, a force maximum occurs in the area of the synchronization phase SP, and after the synchronization phase SP is overcome or traversed the shifting force F decreases rapidly. This means that the force required for disengaging a gear is appreciably less than the force required for engaging a gear, wherein a local force minimum occurs in the area of the neutral position. In order to take this shifting force characteristic into account, in accordance with another feature of the present invention, a transmission arrangement having a force transmission ratio or path transmission ratio which changes with the rotational position can be integrated in the actuator units, for instance, in the actuator units 152, 154, 156 shown in FIGS. 6 and 11. For example, this can be realized by means of a transmission arrangement 290 which is indicated schematically in FIG. 13. This transmission arrangement 290 comprises a first noncircular gearwheel 292 which can replace, e.g., gearwheels 172, 186 or 200 of the drive units 158, 160, 162 and which comprises a second noncircular gearwheel 294 which can replace, e.g., segment gearwheels 170, 184 and 198. It is assumed, for example, that the relative positioning of the two noncircular gearwheels 292, 294 shown in FIG. 13 is the neutral position N. Accordingly, in this position, the area of the greatest radius of the noncircular gearwheel 292 meshes with the area of the smallest radius of the noncircular gearwheel 294. This means that the force transmitted to the noncircular gearwheel 294 is minimal in this relative position during activation of the associated drive unit, wherein, however, the rotational angle of noncircular gearwheel 294 generated per rotational angle of noncircular gearwheel 292 is maximal. However, when rotating out of this position shown in FIG. 13, this changes in direction so that the force transmitted via this transmission arrangement 290 steadily increases, i.e., the output torque per given input rotational angle decreases; however, the output rotational angle decreases per given input rotational angle. This leads to a torque characteristic or force characteristic such as that shown in FIG. 14. It will be seen that a torque minimum occurs in the area of the neutral position, wherein the torque or the delivered force then increases with the shifting path toward both sides. In this case, a symmetric arrangement is advantageous since, depending on whether shifting takes place from first to second gear or from second gear to first gear, for example, the force maximum occurs first between the neutral position and second gear and again between the neutral position and first gear. Therefore, these two force ratios occurring in a clutch unit can be taken into account by means of the noncircular gear unit arrangement 290 shown in FIG. 13.

Through the use of a transmission arrangement of the type mentioned above, it is possible to generate and transmit large forces when such large forces are required and, when smaller forces are required, to generate a maximum adjusting lift of the respective associated shifting finger with reference to a given rotation at the input side. This also contributes to a reduction in the required shifting time. Further, it is not necessary to design the drive units or the step-down reduction to the respective clutch units in such a way that it is capable at all times of transmitting the maximum required force or the maximum required torque, the latter being required only in a determined range, namely, in the synchronizing phase.

FIGS. 15 to 18 show another modification of a transmission, especially in the area of the actuator units, wherein these Figures again show an arrangement of actuator units designed for a five-speed transmission comprising five forward gears and one reverse gear. Components corresponding to the components described with reference to FIG. 6 with respect to construction and function are designated by the same reference numbers. It is also noted that only the areas of the transmission 10 relevant for an understanding of the present invention are shown.

Figure 15:
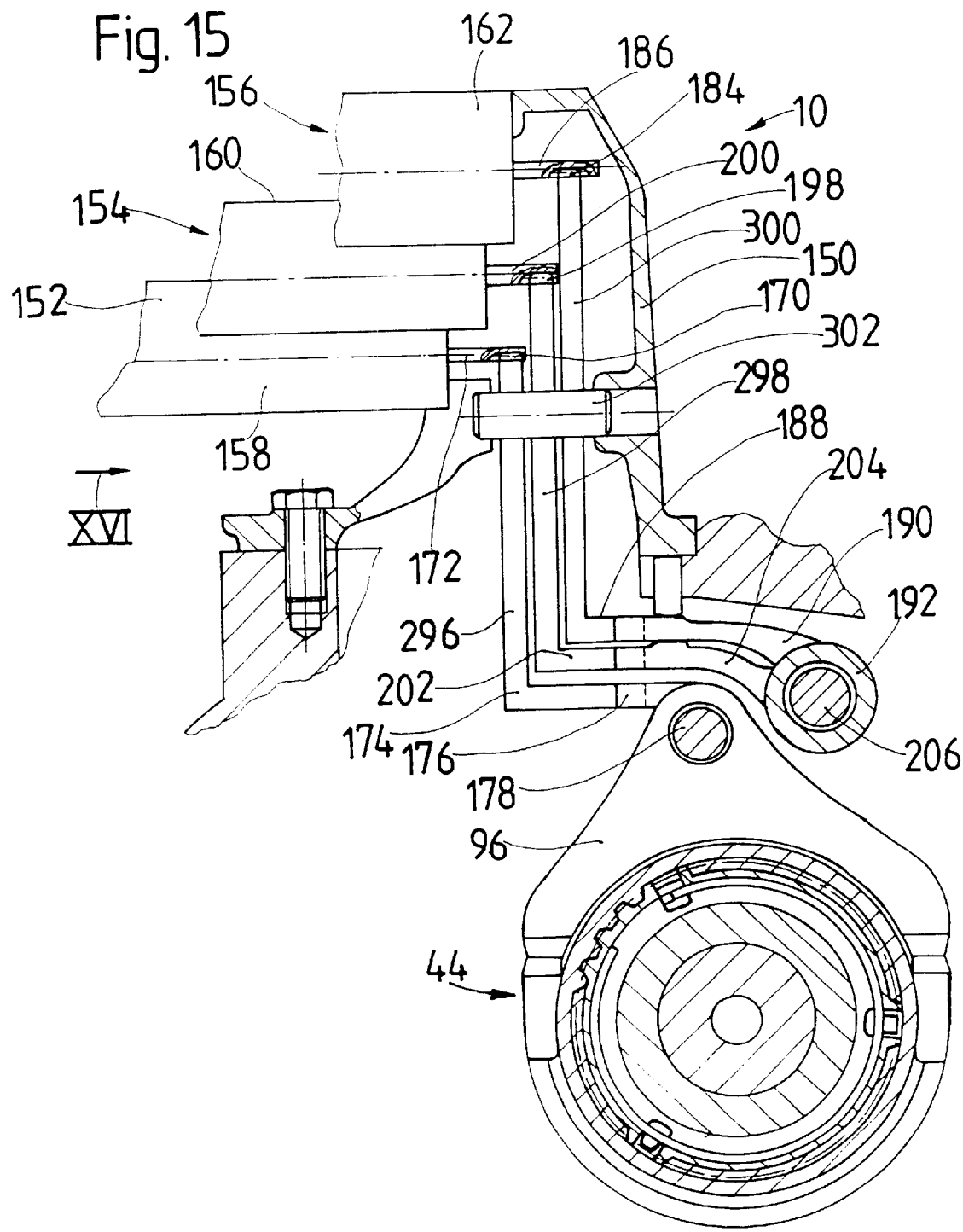
FIG. 15 shows another partial sectional view of a transmission with an alternative constructional type of actuator unit.

In the embodiment form shown in FIG. 15, the driving force of the drive units 152, 154, 156 is transmitted to the respective shaft parts 178, 206, 192 via transmission levers 296, 298 and 300. All transmission levers 296, 298, 300 are supported so as to be swivelable about a common swivel pin part 302 at the transmission housing 150. In one end area, the transmission levers 296, 298, 300 carry the segment teeth 170, 198, 184 which mesh with the gearwheels 172, 200 and 186 of the drive units 158, 160, 162. In their other end area, the transmission levers 296, 298, 300 carry the shifting fingers 174, 202 and 188 in an angled manner and, as was shown in FIG. 6, these shifting fingers 174, 202 and 188 engage with respective driver elements 176, 204 and 190 each of which is fixedly connected with the associated shaft parts 178, 206 and 192. It will be seen in this case that the shaft part 192 is constructed as a hollow shaft in which the shaft part 206 is guided at least in some areas. Further, FIG. 15 schematically shows the clutch unit 94 and its shifting claw 96 which are fixedly connected with the shaft part 178 and which can be displaced by the swiveling of the transmission lever 296 out of the drawing plane or toward the rear with respect to the drawing plane, depending on the swiveling direction, for activating or deactivating the different gear speeds.

Figure 16:
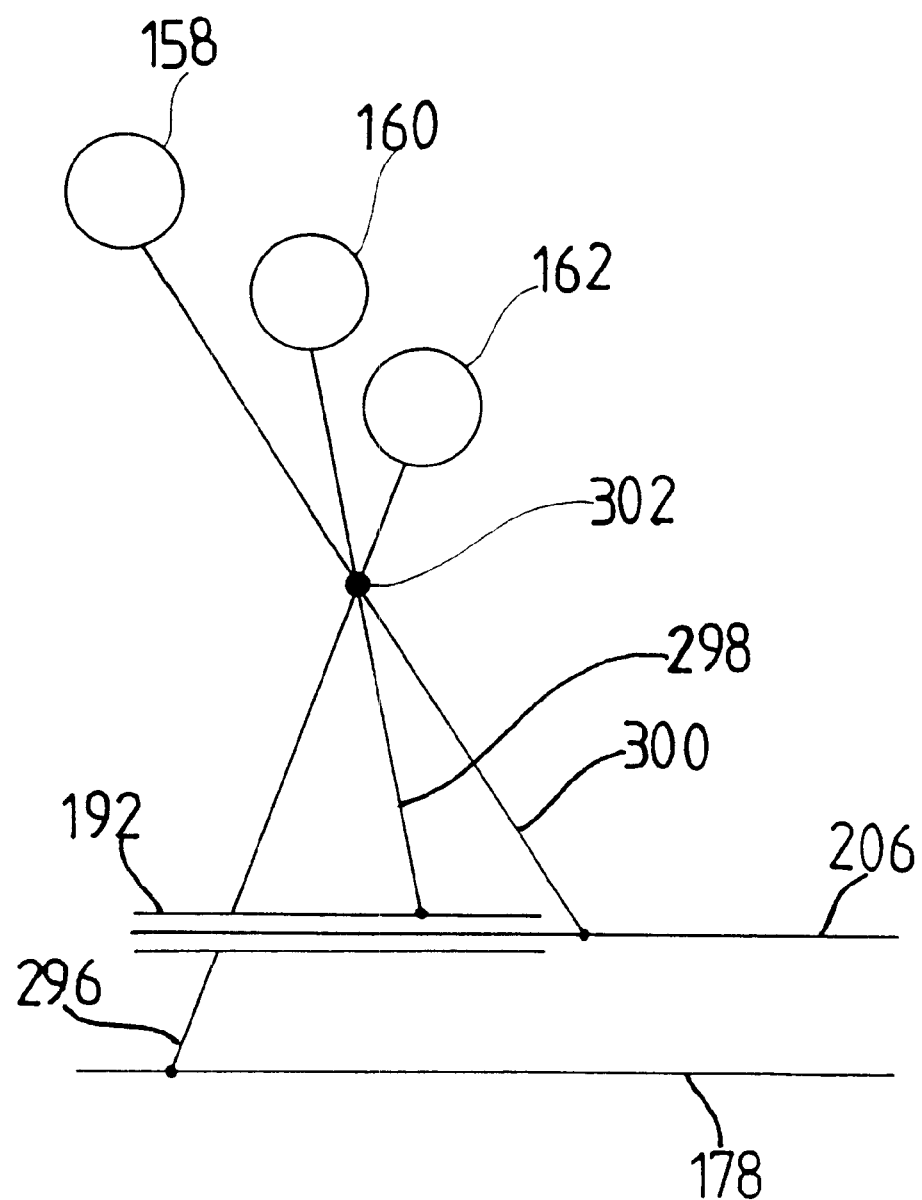
FIG. 16 shows a schematic view of the arrangement shown in FIG. 15 in viewing direction XVI.

As can be seen from FIG. 16, the three transmission levers 296, 298, 300 are positioned so as to be swiveled relative to one another about the associated swiveling axis to allow them to be brought up to the respective shaft parts 178, 192 and 206.

Figure 17:
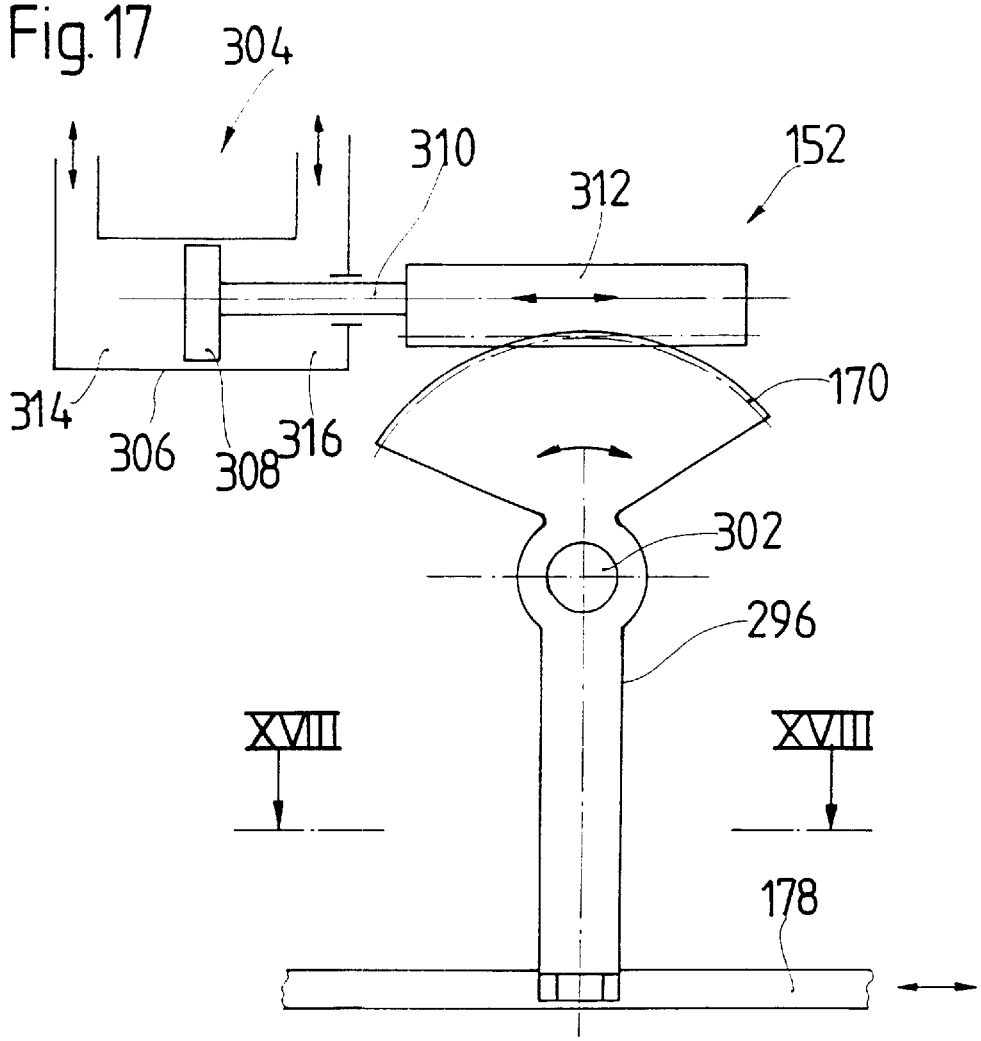
FIG. 17 shows an alternative constructional type of an actuator unit shown in FIG. 15.
Figure 18:
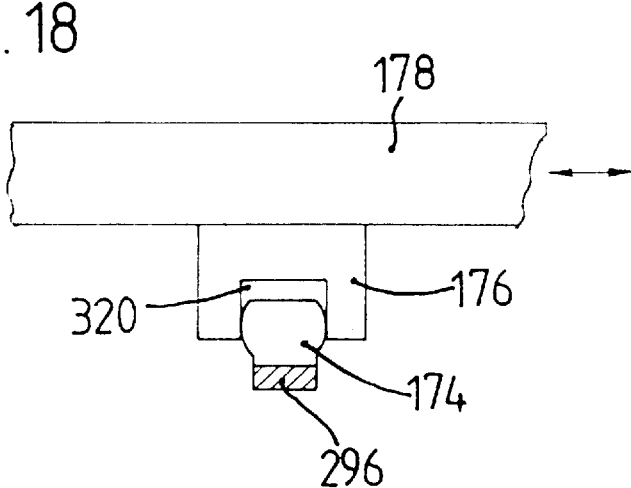
FIG. 18 shows a section through an actuator unit along a line XVIII—XVIII in FIG. 17.

FIGS. 17 and 18 show different views of a modification of the actuator unit 152 shown in FIG. 15 by way of example. It will be seen that a piston-cylinder arrangement 304 with a double-acting cylinder 306 in which a piston element 308 is received so as to be displaceable is provided in this case instead of an electric-motor drive. The piston element 308 is coupled with a toothed rack portion 312 by a piston rod 310, so that the toothed rack portion 312 can be displaced in the direction of the arrow by supplying and discharging fluid in respective cylinder chambers 314, 316. The toothed rack portion 312 meshes with the segment toothing portion 170 of the transmission lever 296, so that a linear displacement of the toothed rack portion 312 leads to the swiveling movement of the transmission lever 296 and the latter then displaces the shaft part 178 in its longitudinal direction.

FIG. 18 shows the driver element 176 which is secured to the shaft part 278 and which has a driver recess 320 in which the shifting finger 174 engages by a spherically shaped end area. This ensures that the driver element 176 and shifting finger 174 contact one another with the least possible friction. Of course, the two other actuator units 154, 156 can also be constructed in this manner.

It is noted that the transmission of driving forces from respective drive units, for example, electric motors, piston-cylinder arrangements or lifting magnet arrangements, piezo elements or the like, to the respective clutch units can be carried out in a self-locking manner in the embodiment forms described with reference to FIGS. 6 to 18, e.g., through the use of self-locking toothings, e.g., of a worm gear or the like. It can be ensured in this way that the clutch units and the components which are displaceable therein can only be displaced when the associated drive units are excited. Further steps for preventing unwanted movement of the clutch units are then not required. Further, the construction, according to the invention, of a transmission in which separate actuator units are provided for different clutch units has the advantage that the backlash resulting from the different mechanical coupling can be minimized, so that a very direct coupling of the respective drive units with the members of the clutch units to be actuated is achieved. As a result, the toothing portions which are present in the synchronizing areas of the clutch units and described with reference to FIG. 3 and which must be brought into a meshing engagement for producing the rotational coupling of a respective gearwheel with the transmission input shaft or transmission output shaft can be arranged with a slight overlap. This results in a path reduction when carrying out shifting processes and a corresponding reduction in the time required for carrying out the shifting processes.

Further, it is noted that a control device controlling the different actuator units of the transmission according to the invention can, of course, also be integrated completely or partly in a control device for an internal combustion engine or another motor. A combination with a control device for an anti-locking system or anti-skid system is also possible.

The embodiment forms of a transmission which are described with reference to FIGS. 6 to 18 are especially suited for the grouping together of different torque transmission paths in a clutch unit as was described in the beginning. As has already been stated, it is possible in this way to achieve the essential advantage that two torque transmission paths to be activated immediately following one another are not activated by the same clutch unit and therefore not by the same actuator units, so that a substantial reduction in shifting time can be achieved. For example, a clutch unit which can activate the torque transmission paths for the first and fourth gear of a six-speed transmission can be actuated by one of the actuator units 152, 154, 156. Another of these actuator units can actuate a clutch unit which can activate the torque transmission paths for the second gear and fifth gear, and the third actuator unit can actuate a clutch unit which can activate torque transmission paths for the third gear and the sixth gear or, as the case may be, a reverse gear (especially in five-speed transmissions). It will be seen from this that the advantage of minimized shifting time can also be achieved when skipping over up to two gears.

Further, it will be seen in the embodiment forms described in FIGS. 6 to 18 that these embodiment forms can be integrated in a simple manner in shift transmissions of conventional construction, so that no substantial conversion steps, if any, are required in the transmission itself, especially also in the transmission housing itself. It is even conceivable to integrate these actuator units completely, that is, including the drive units, in the transmission housing.

It is further noted that the transmission according to the invention can be combined in a particularly advantageous manner with a 36-volt or 42-volt onboard power supply because, as was stated above, especially when using the transmission arrangement, according to the invention, with changeable force conversion ratio, the different drive units can have very small dimensions and the energy requirement for carrying out a shifting process is therefore kept small.

The invention is not limited by the embodiments described above which are presented as examples only but can be modified in various ways within the scope of protection defined by the appended patent claims.

We claim:

1. An automatic transmission, comprising:

a single input shaft;

a single clutch operatively connected to the input shaft so as to couple and uncouple the input shaft to and from a drive shaft;

a plurality of torque transmission paths which can be selectively activated for torque transmission, the torque transmission paths having different transmission characteristics and, based on their transmission characteristics, can be ordered in a sequence of torque transmission paths, the torque transmission paths being arranged in a plurality of groups, the groups being configured in one of the following ways:

each group comprising only one individual torque transmission path;

at least one group comprising a plurality of torque transmission paths; and at least one group comprising an individual torque transmission path and at least one additional group comprising a plurality of torque transmission paths; and a clutch arrangement by which at least one of the torque transmission paths can be activated, the clutch arrangement including a clutch unit associated with a group of the torque transmission paths and by which a torque transmission path of a group of torque transmission paths can be selectively activated, at least one group of the torque transmission paths, insofar as the at least one group comprises a plurality of the torque transmission paths, comprises only torque transmission paths which do not immediately follow one another in sequence, each torque transmission path comprising a transmission member which can be coupled by the clutch arrangement to the input shaft for common rotation therewith.

2. An automatic transmission according to claim 1, and further comprising an actuator unit associated with every clutch unit of the clutch arrangement.

3. An automatic transmission according to claim 1, wherein every clutch unit comprises a synchronizing mechanism for every torque transmission path of the group of torque transmission paths associated with the clutch unit.

4. An automatic transmission according to claim 1, wherein the transmission member is a gear wheel.

5. An automatic transmission according to claim 1, wherein every group of torque transmission paths comprises two torque transmission paths.

6. An automatic transmission according to claim 1, wherein between every two torque transmission paths of at least one group of torque transmission paths, which two torque transmission paths follow one another in sequence with respect to their transmission characteristic, there is located at least one torque transmission path of another group of torque transmission paths.

7. An automatic transmission according to claim 1, wherein a first group of the torque transmission paths comprises torque transmission paths for a first gear speed and a third gear speed, and a second group of the torque transmission paths comprises torque transmission paths for a second gear speed and a fourth gear speed.

8. An automatic transmission according to claim 7, wherein the second group further comprises a torque transmission path for a reverse gear.

9. An automatic transmission according to claim 1, wherein between two torque transmission paths of at least one group of torque transmission paths, which two torque transmission paths follow one another in sequence with respect to their characteristic, there are at least two torque transmission paths which are not contained in this group.

10. An automatic transmission according to claim 9, wherein a first group of the torque transmission paths comprises the torque transmission paths for first and fourth gear speeds, a second group of the torque transmission paths comprises the torque transmission paths for second and fifth gear speeds, and a third group of the torque transmission paths comprises a torque transmission path for a third gear speed.

11. An automatic transmission according to claim 10, wherein the third group further comprises at least one of a torque transmission path for a reverse gear and a torque transmission path for a sixth gear speed.

12. An automatic transmission according to claim 2, wherein at least one of the actuator units has an electric-motor drive unit which acts on the associated clutch unit via a transmission arrangement.

13. An automatic transmission according to claim 12, wherein the electric-motor drive unit is a brushless electric motor.

14. An automatic transmission according to claim 1, wherein the transmission characteristics of the individual torque transmission paths are defined by a speed reduction ratio provided in the respective torque transmission paths, an order sequence of the torque transmission paths being defined by a sequence of torque transmission paths with ascending and descending speed reduction ratios.

* * * * *